United States Patent
Ohkubo

(10) Patent No.: US 9,513,124 B2
(45) Date of Patent: Dec. 6, 2016

(54) VELOCITY CALCULATION DEVICE, VELOCITY CALCULATION METHOD, AND NAVIGATION DEVICE

(71) Applicant: Sony Corporation, Tokyo (JP)

(72) Inventor: Masashi Ohkubo, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/630,816

(22) Filed: Feb. 25, 2015

(65) Prior Publication Data

US 2015/0211860 A1 Jul. 30, 2015

Related U.S. Application Data

(63) Continuation of application No. 12/583,666, filed on Aug. 24, 2009, now Pat. No. 8,989,982.

(30) Foreign Application Priority Data

Aug. 29, 2008 (JP) ................ P2008-221713

(51) Int. Cl.
| | | |
|---|---|---|
| *G01C 21/16* | (2006.01) | |
| *G01P 3/00* | (2006.01) | |
| *G01C 21/00* | (2006.01) | |
| *G01P 3/22* | (2006.01) | |
| *G01P 3/50* | (2006.01) | |
| *G01P 15/18* | (2013.01) | |

(52) U.S. Cl.
CPC ............. *G01C 21/00* (2013.01); *G01C 21/16* (2013.01); *G01P 3/00* (2013.01); *G01P 3/22* (2013.01); *G01P 3/50* (2013.01); *G01P 15/18* (2013.01)

(58) Field of Classification Search
CPC ............ G01P 3/00; G01P 3/22; G01P 3/50; G01C 21/16
USPC .............................. 701/79, 91, 93
See application file for complete search history.

(56) References Cited

U.S. PATENT DOCUMENTS 4,831,544 A 5/1989 Hojo et al.
7,603,213 B2 10/2009 Iida
(Continued)

FOREIGN PATENT DOCUMENTS

DE 10354944 A1 6/2005
EP 1903306 A2 3/2008
(Continued)

OTHER PUBLICATIONS

ProQuest Dialog English translation of DE 10354944, Jun. 30, 2005.*
(Continued)

*Primary Examiner* — Tan Q Nguyen
(74) *Attorney, Agent, or Firm* — Lerner, David, Littenberg, Krumholz & Mentlik, LLP

(57) ABSTRACT

A velocity calculation device includes: a vertical direction acceleration detection portion that is mounted on a vehicle and detects an acceleration in a vertical direction generated correspondingly to undulation of a road surface; a horizontal direction angular velocity detection portion that is mounted on the vehicle and detects an angular velocity about a horizontal axis orthogonal to a travel direction of the vehicle generated correspondingly to the undulation of the road surface; and a velocity calculation portion that calculates a velocity in the travel direction of the vehicle on the basis of the acceleration in the vertical direction and the angular velocity about the horizontal axis.

8 Claims, 37 Drawing Sheets

CONFIGURATION OF VELOCITY CALCULATION PORTION

(56) References Cited

U.S. PATENT DOCUMENTS

| | | | |
|---|---|---|---|
| 2004/0133365 A1* | 7/2004 | Drumm | B60T 8/172 |
| | | | 702/41 |
| 2004/0236485 A1 | 11/2004 | Deniau et al. | |
| 2005/0085952 A1 | 4/2005 | Park et al. | |
| 2006/0190213 A1 | 8/2006 | Nakakita et al. | |
| 2007/0067137 A1 | 3/2007 | Ohkubo et al. | |
| 2007/0162212 A1* | 7/2007 | Pengov | B60T 8/17551 |
| | | | 701/69 |
| 2008/0012698 A1 | 1/2008 | Kobayashi et al. | |
| 2008/0071476 A1 | 3/2008 | Hoshizaki | |
| 2008/0243384 A1 | 10/2008 | Ohkubo et al. | |
| 2010/0228422 A1* | 9/2010 | Gartner | B60G 17/0165 |
| | | | 701/31.4 |

FOREIGN PATENT DOCUMENTS

| | | |
|---|---|---|
| JP | 63-150622 A | 6/1988 |
| JP | 09096535 | 4/1997 |
| JP | 10132589 | 5/1998 |
| JP | 10168810 | 6/1998 |
| JP | 2000131082 A | 5/2000 |
| JP | 2007182209 A | 7/2007 |
| JP | 2008-076389 A | 4/2008 |
| JP | 2008076374 A | 4/2008 |
| JP | 2008089517 A | 4/2008 |
| JP | 201056782 A | 3/2010 |
| WO | 2008046700 A1 | 4/2007 |

OTHER PUBLICATIONS

European Search Report EP 09168910, dated Dec. 29, 2010.
EPO Machine english translation of DE10354944.
Collinson, "Fly-by-wire flight control" Computing & Control Engineering Journal, Aug. 1999, pp. 141-152.
Japanese Office Action for Application No. 2009-198593 dated Mar. 12, 2013.

* cited by examiner

FIG.1A
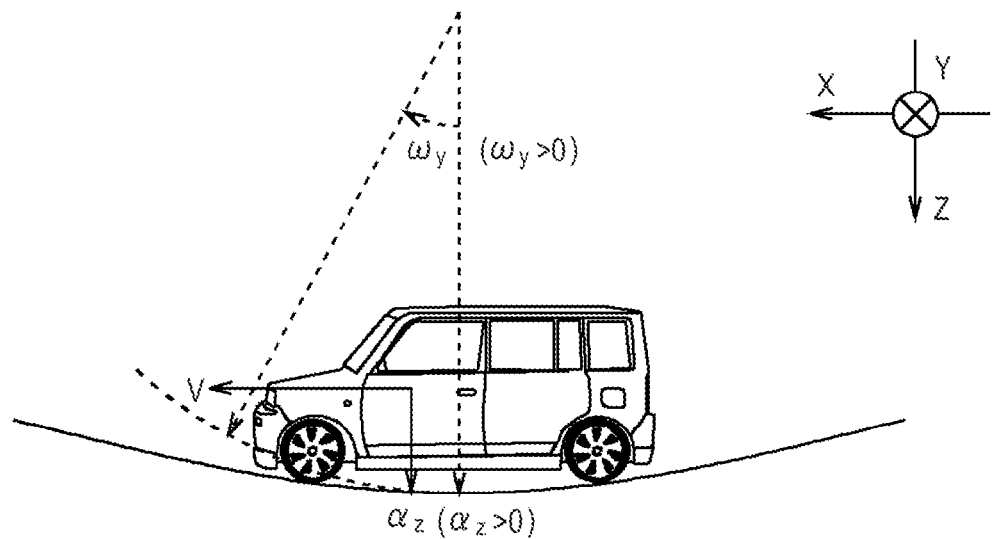
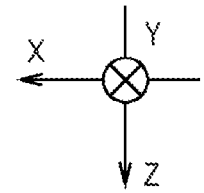
FIG.1B
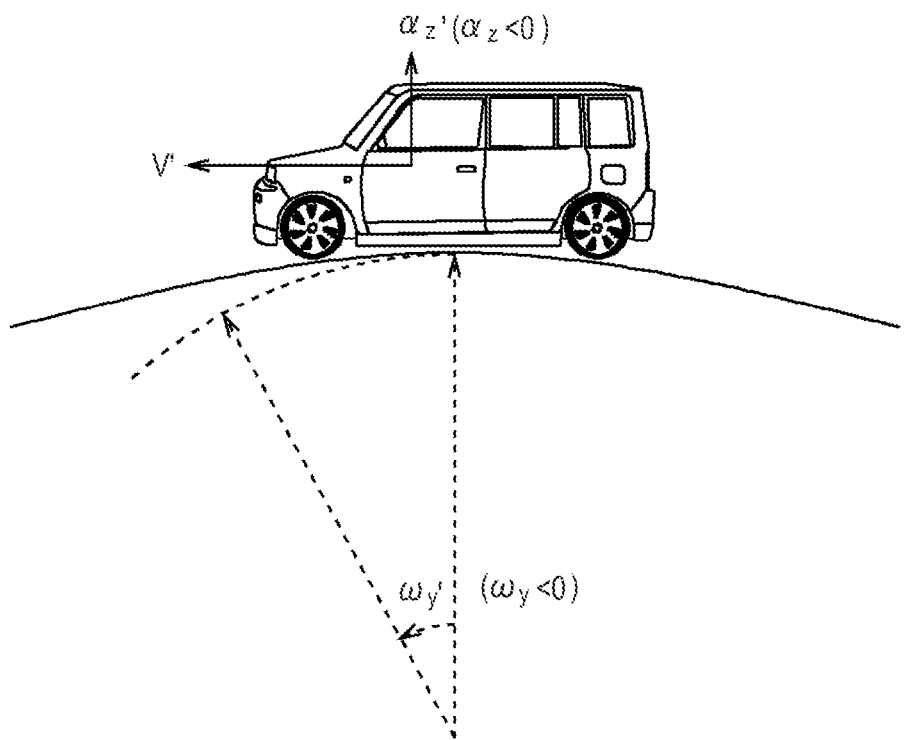
STATES WHEN TRAVELING ON CONCAVE AND CONVEX ROAD SURFACES

STATE WHEN TRAVELING ALONG CURVE

CURRENT POSITION CALCULATION METHOD USING VELOCITY AND ANGLE

OVERALL CONFIGURATION OF PND

DEFINITIONS OF COORDINATE SYSTEM OF PND

SENSOR CONFIGURATION OF PND

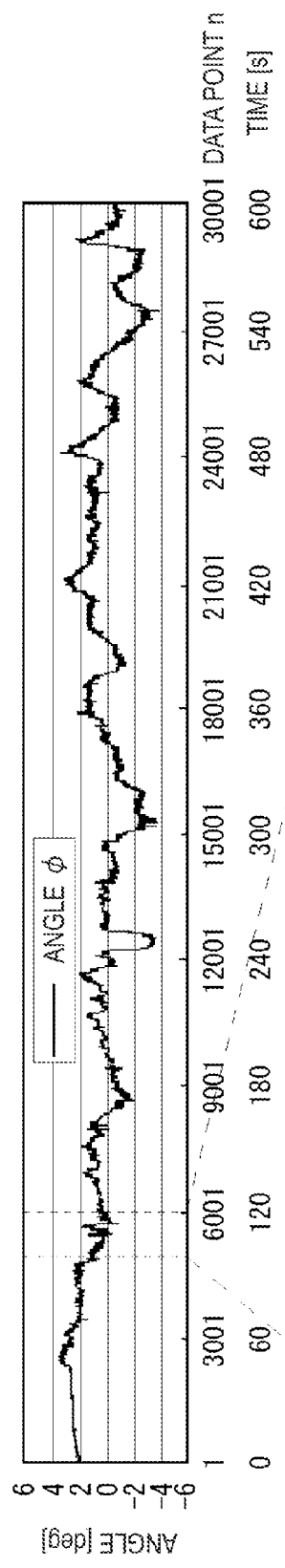
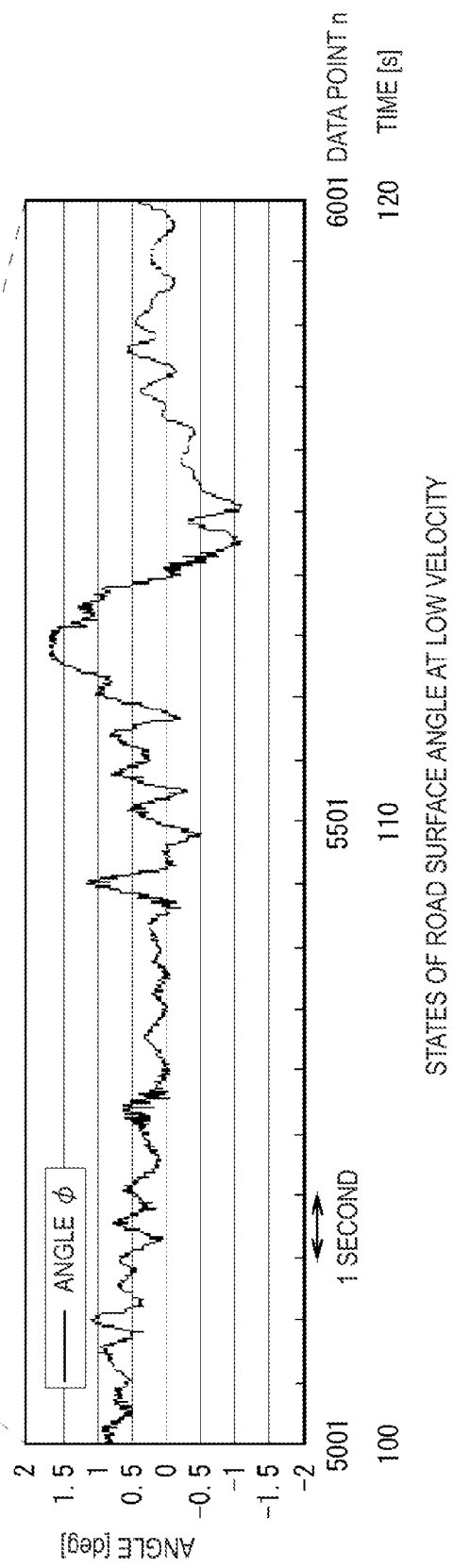
FIG.10A
FIG.10B
STATES OF ROAD SURFACE ANGLE AT LOW VELOCITY

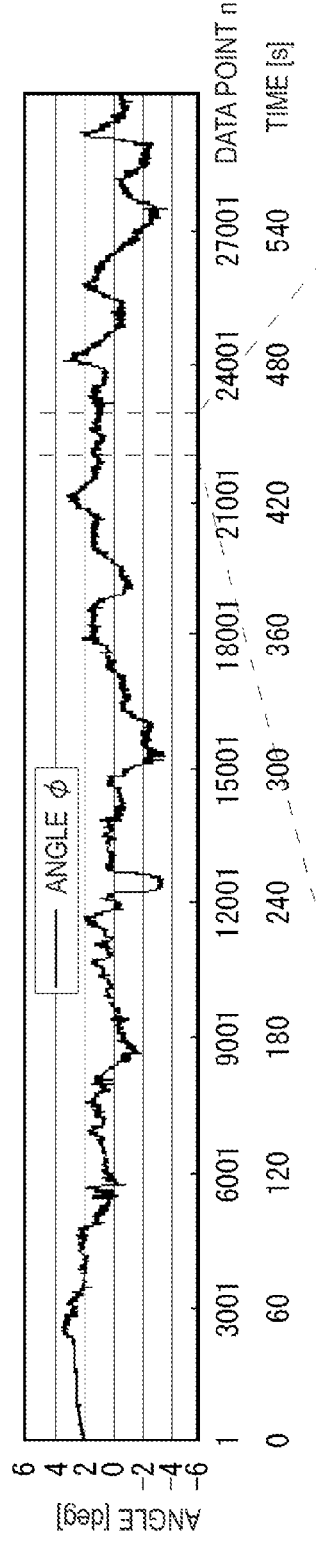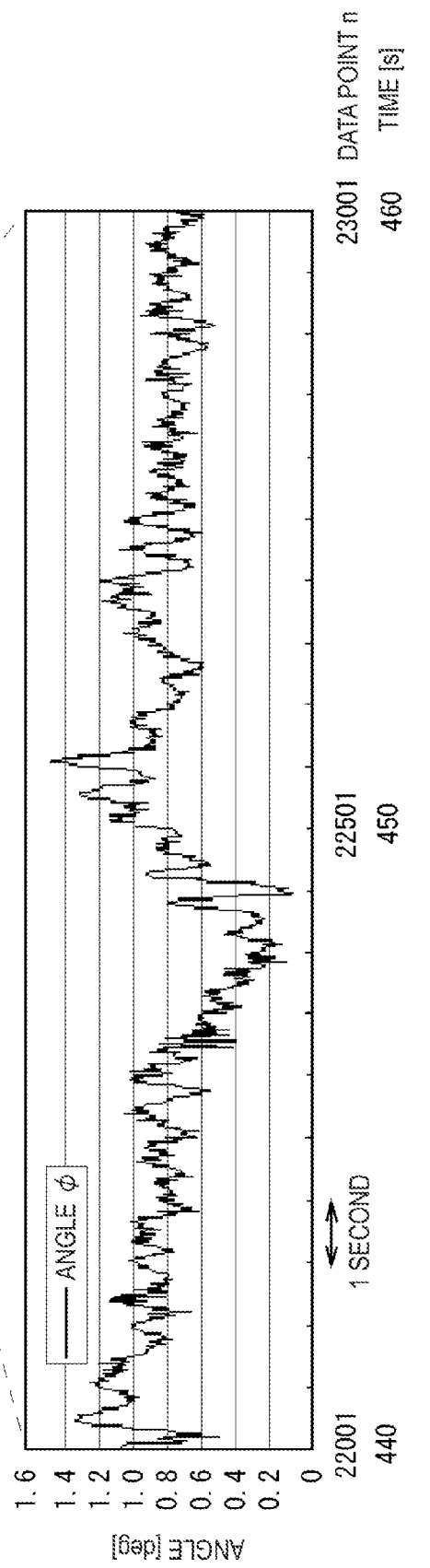
FIG.11A
FIG.11B
STATES OF ROAD SURFACE ANGLE AT HIGH VELOCITY

STATE OF OSCILLATION BY CRADLE

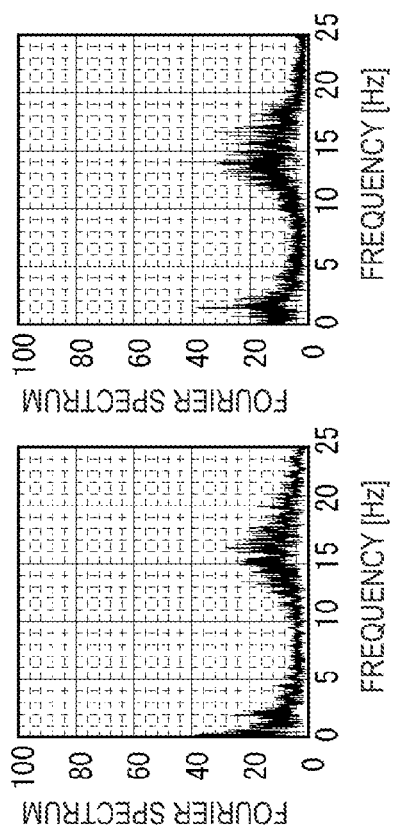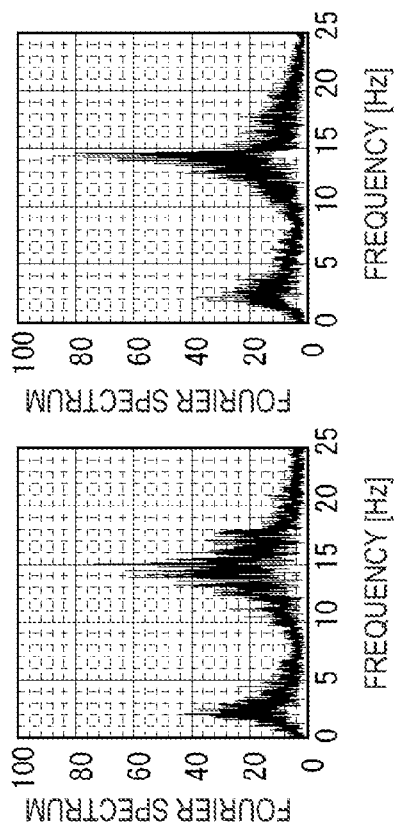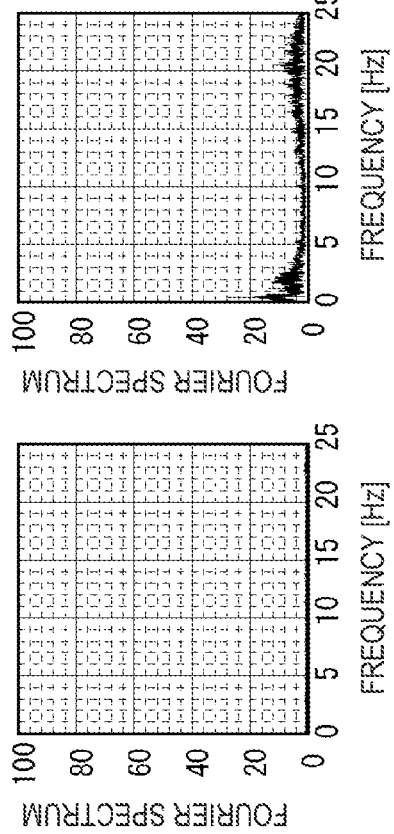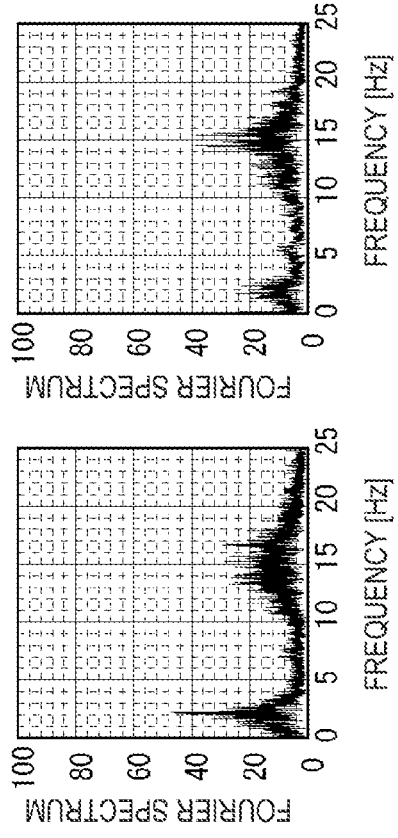
FIG.15A  FIG.15B  FIG.15C  FIG.15D
FIG.15E  FIG.15F  FIG.15G  FIG.15H
ADDITIVE ANGULAR VELOCITY FOURIER TRANSFORMED IN EVERY 4096 DATA POINTS

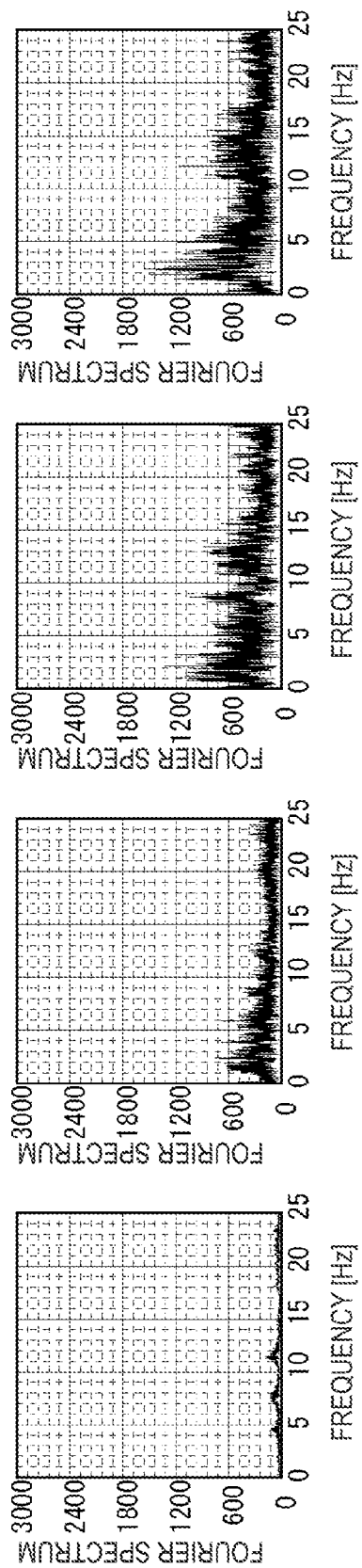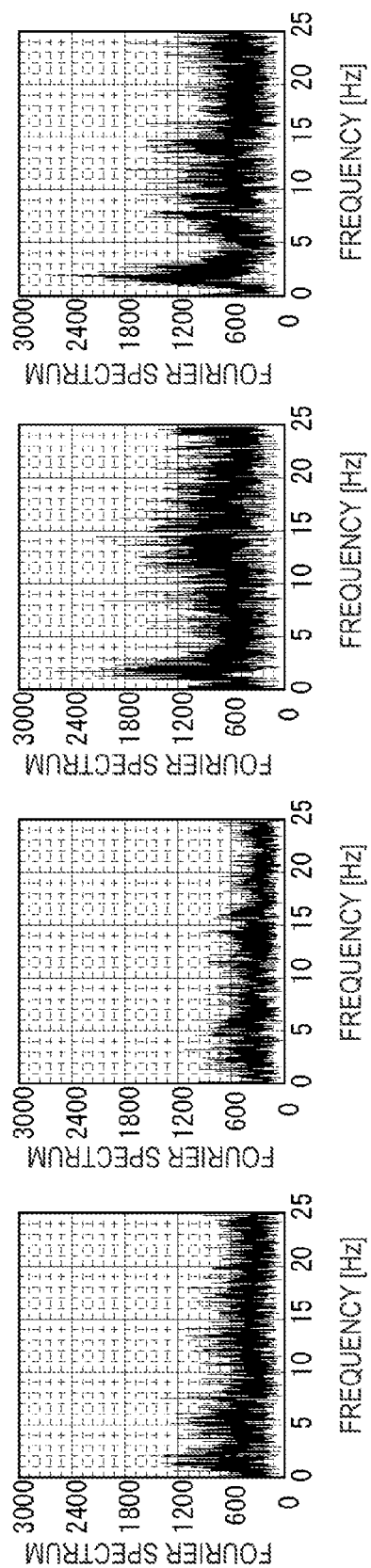
ADDITIVE ACCELERATION FOURIER TRANSFORMED IN EVERY 4096 DATA POINTS FIG.17A
FIG.17B
FIG.17C
FIG.17D
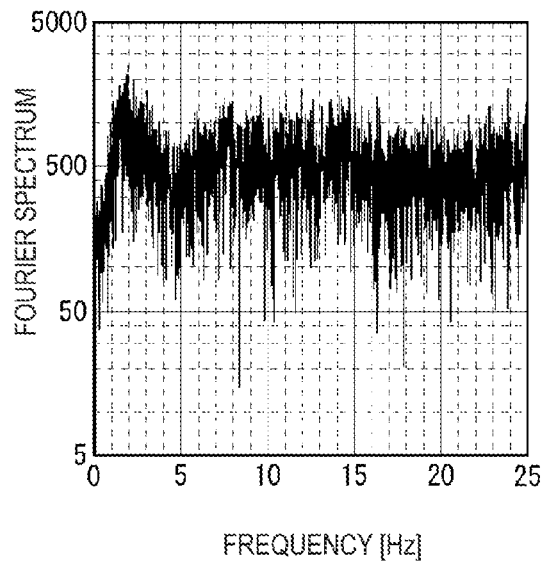
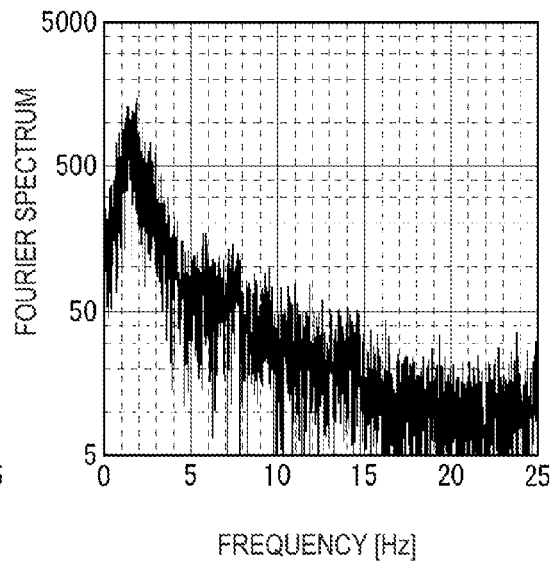
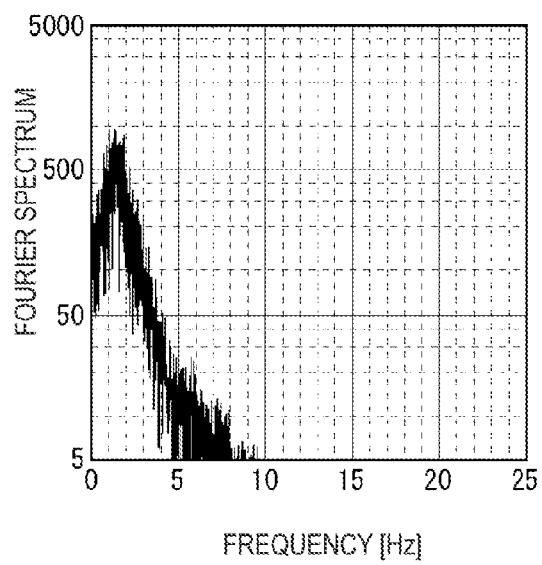
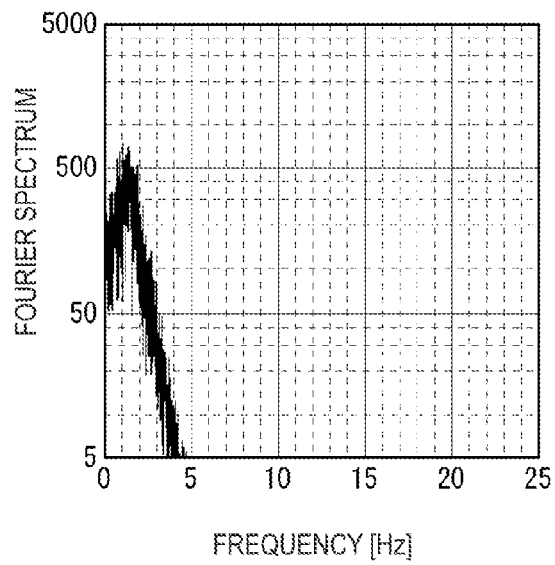
COMPARISON OF LOW-PASS FILTER PROCESSING ON ADDITIVE ACCELERATION FIG.18A
FIG.18B
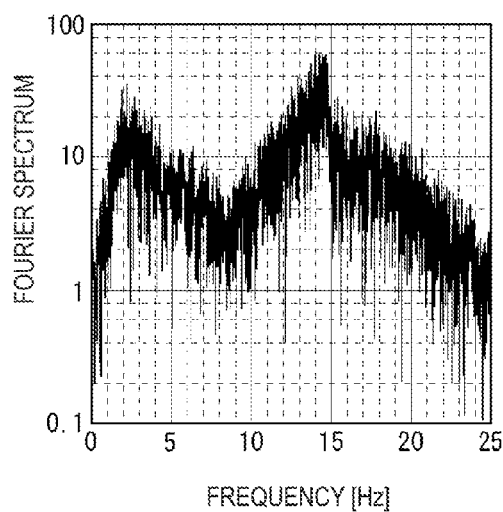
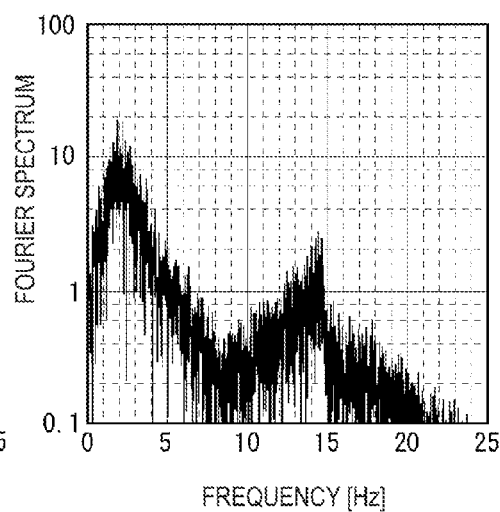
FIG.18C
FIG.18D
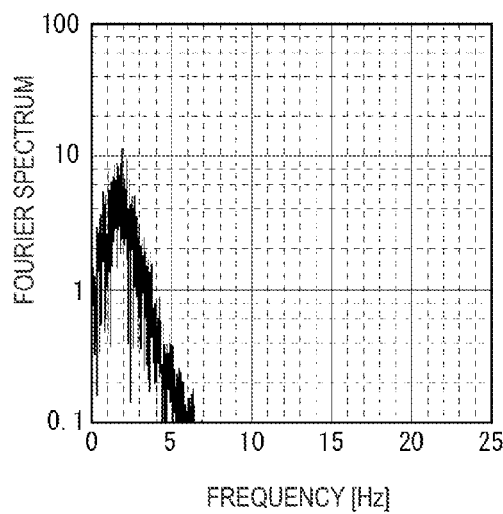
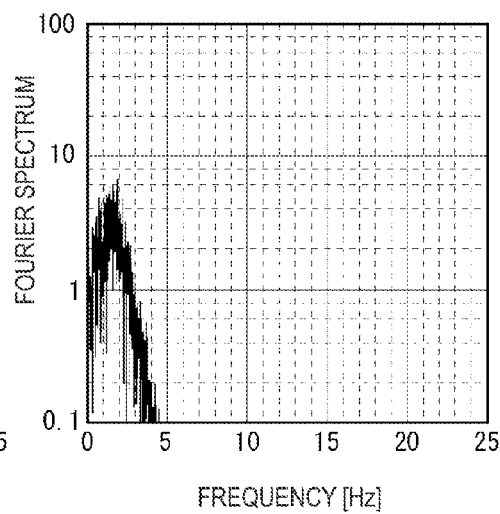
COMPARISON OF LOW-PASS FILTER PROCESSING ON ADDITIVE ANGULAR VELOCITY

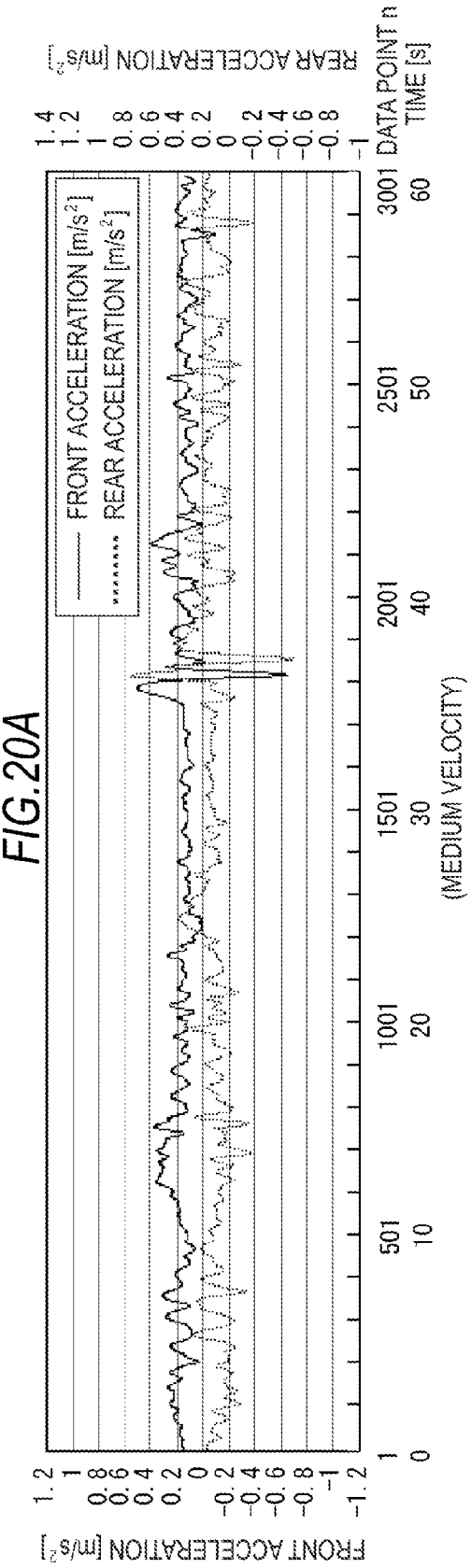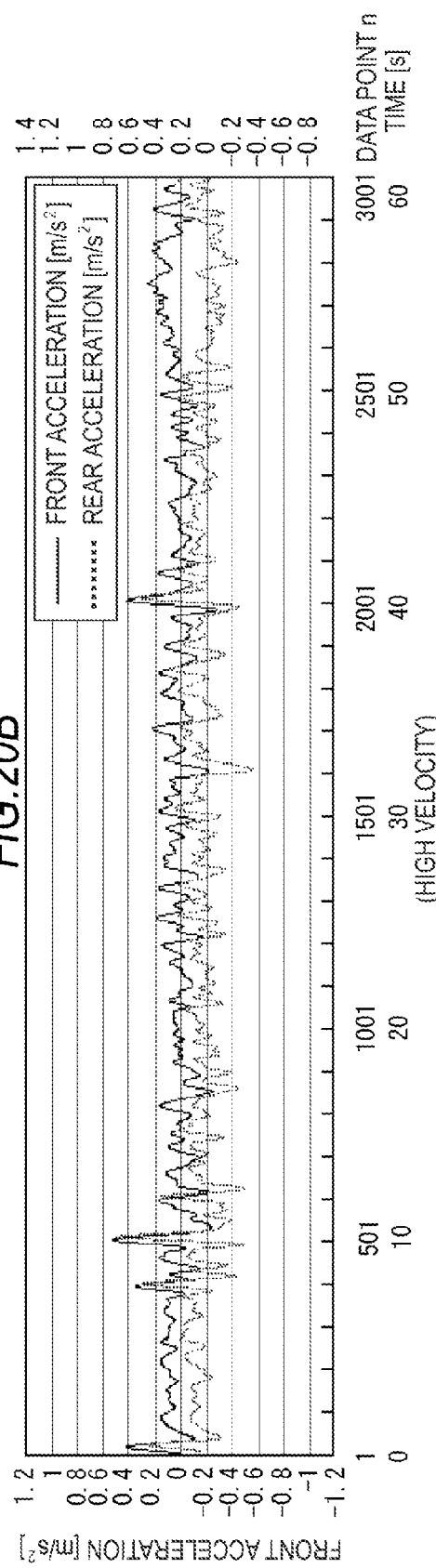

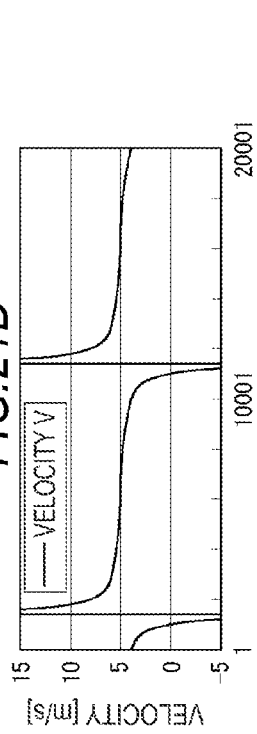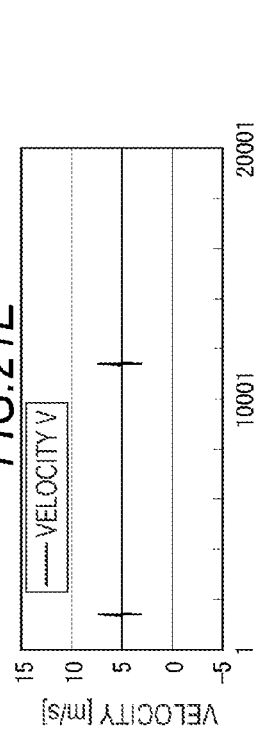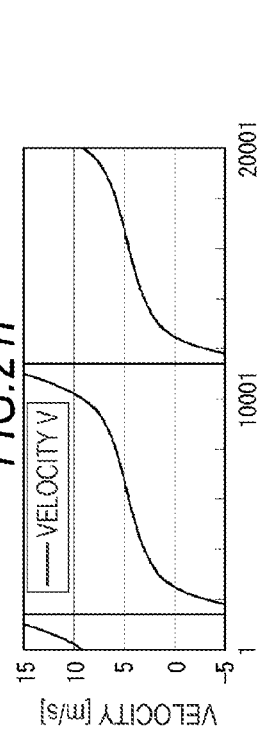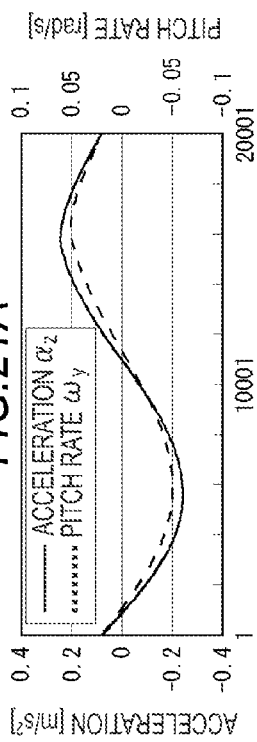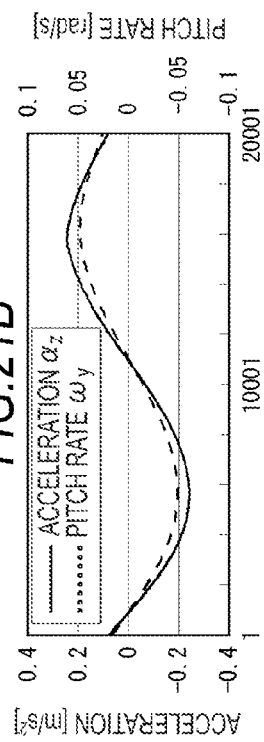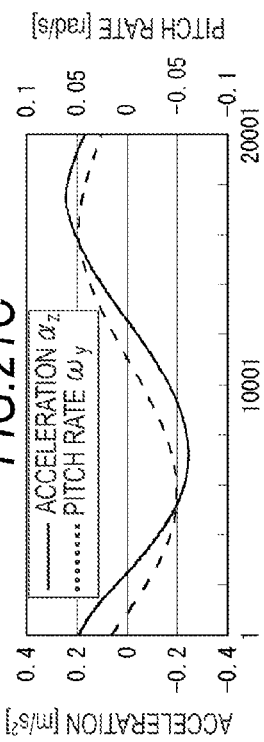
EXAMPLES OF SIMULATIONS OF ACCELERATION, PITCH RATE, AND VELOCITY AT 3 MOUNT POSITIONS

RELATION OF MAXIMUM VALUE AND MINIMUM VALUE

RELATION OF VELOCITY AND DATA POINT NUMBER

STATES OF PITCH RATE AND ANGULAR VELOCITY IN DIFFERENT ARC LENGTHS

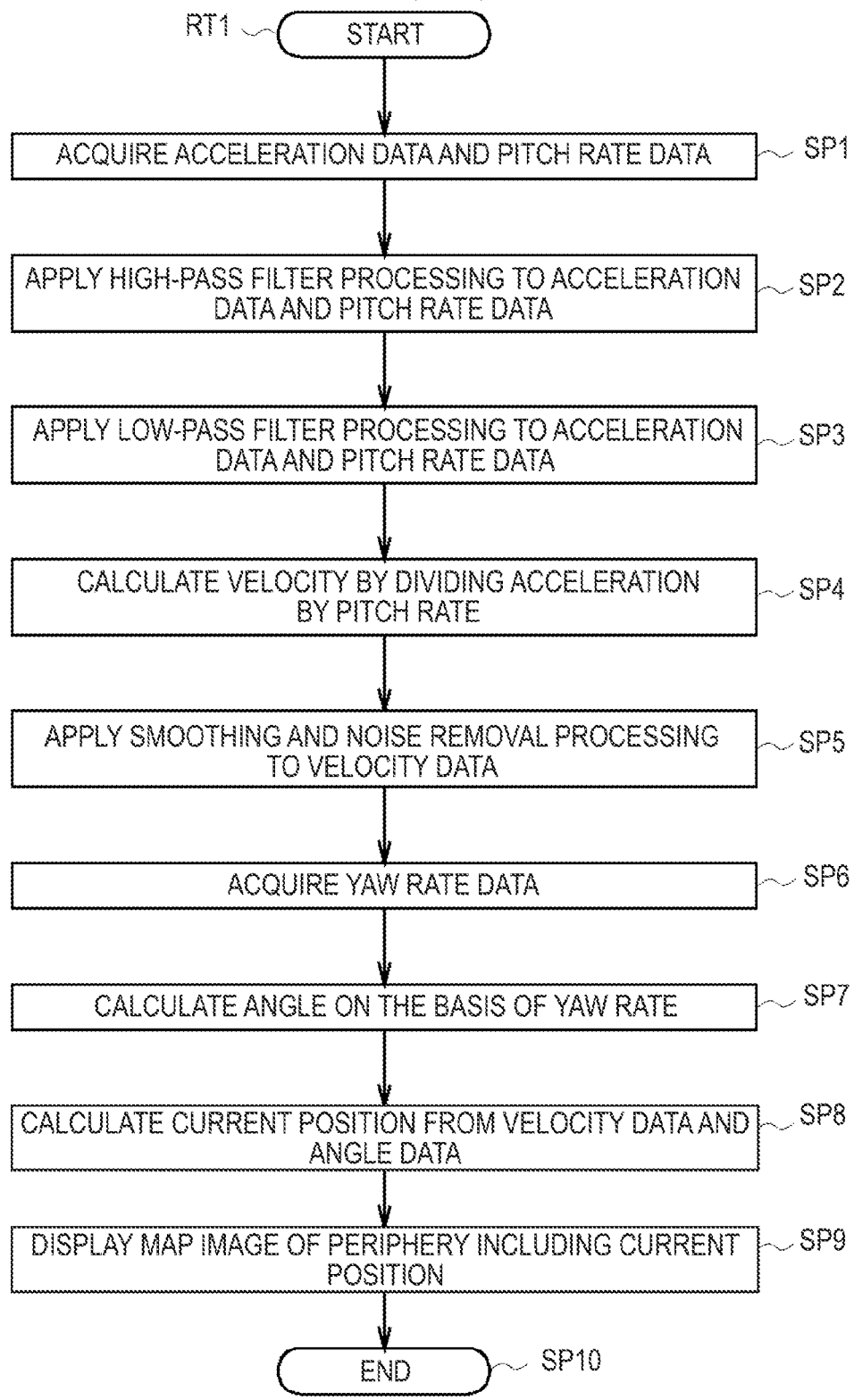

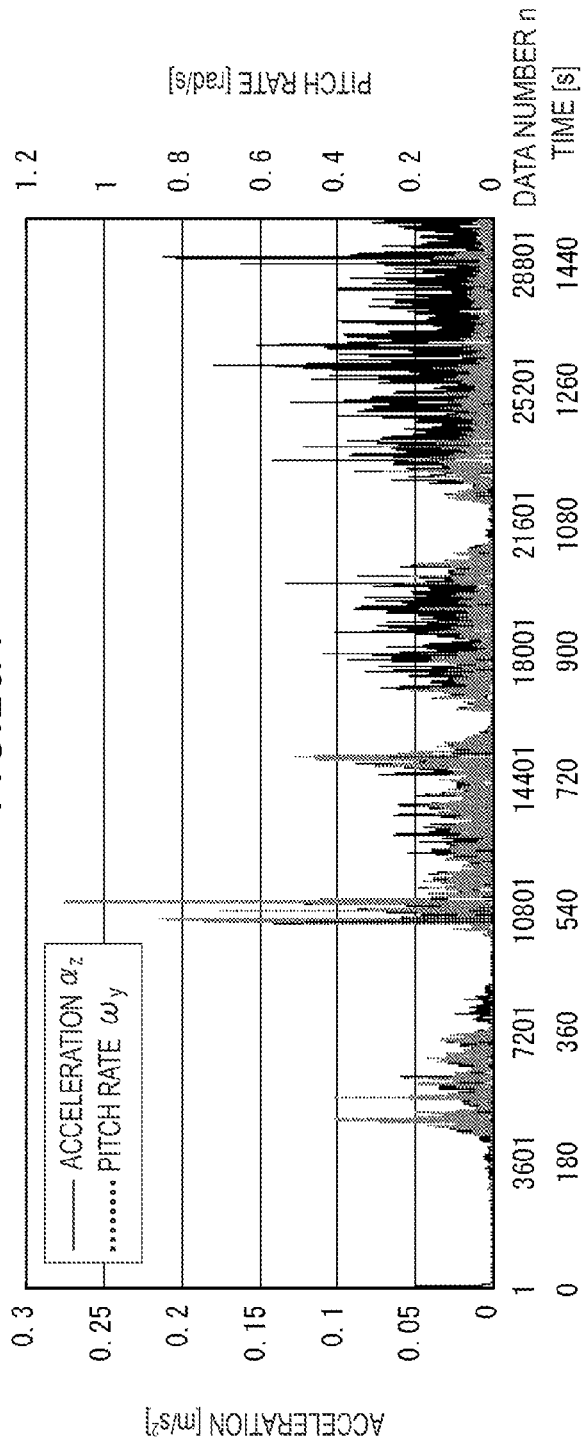
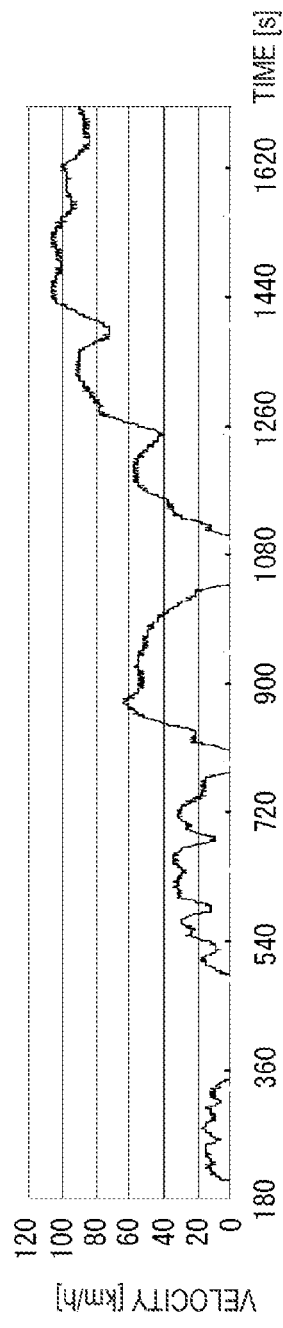
FIG.26A
FIG.26B
EXAMPLES OF MEASUREMENT RESULTS OF ACCELERATION, PITCH RATE, AND VELOCITY

COMPARISON (1) OF MEASUREMENT RESULT WITH REFERENCE

COMPARISON (2) OF MEASUREMENT RESULT WITH REFERENCE

COMPARISON (3) OF MEASUREMENT RESULT WITH REFERENCE

COMPARISON (4) OF MEASUREMENT RESULT WITH REFERENCE

COMPARISON (5) OF MEASUREMENT RESULT WITH REFERENCE

COMPARISON (i) OF MEASUREMENT RESULT WITH REFERENCE AT CURVE

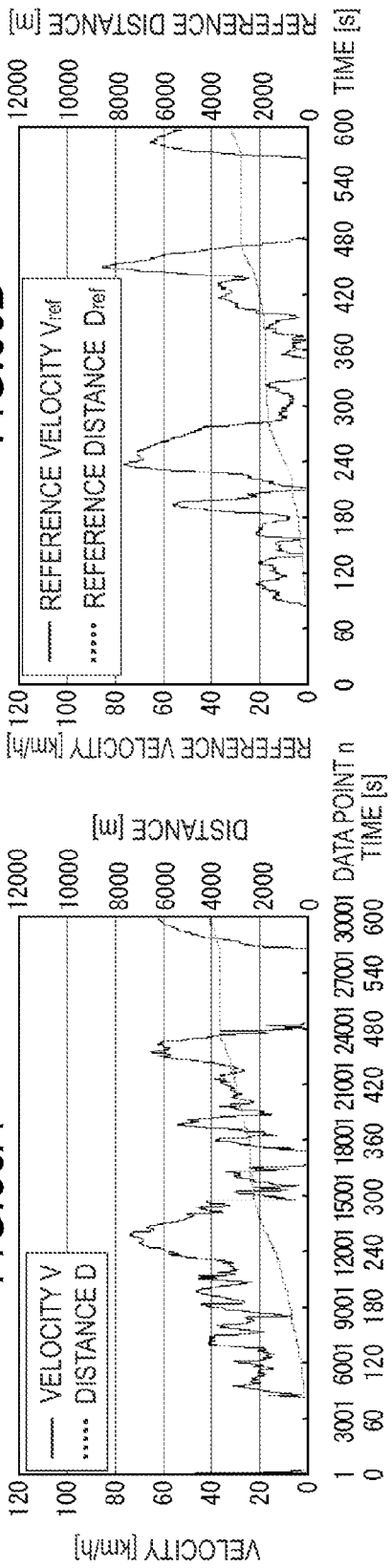

COMPARISON (3) OF MEASUREMENT RESULT WITH REFERENCE AT CURVE

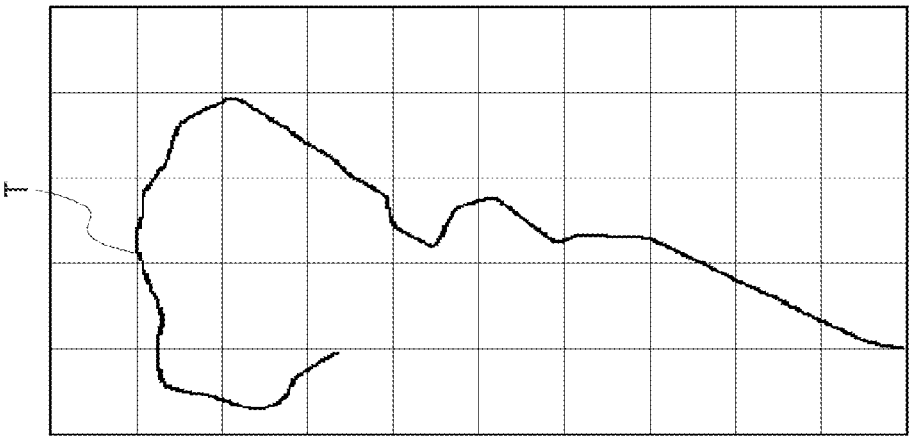
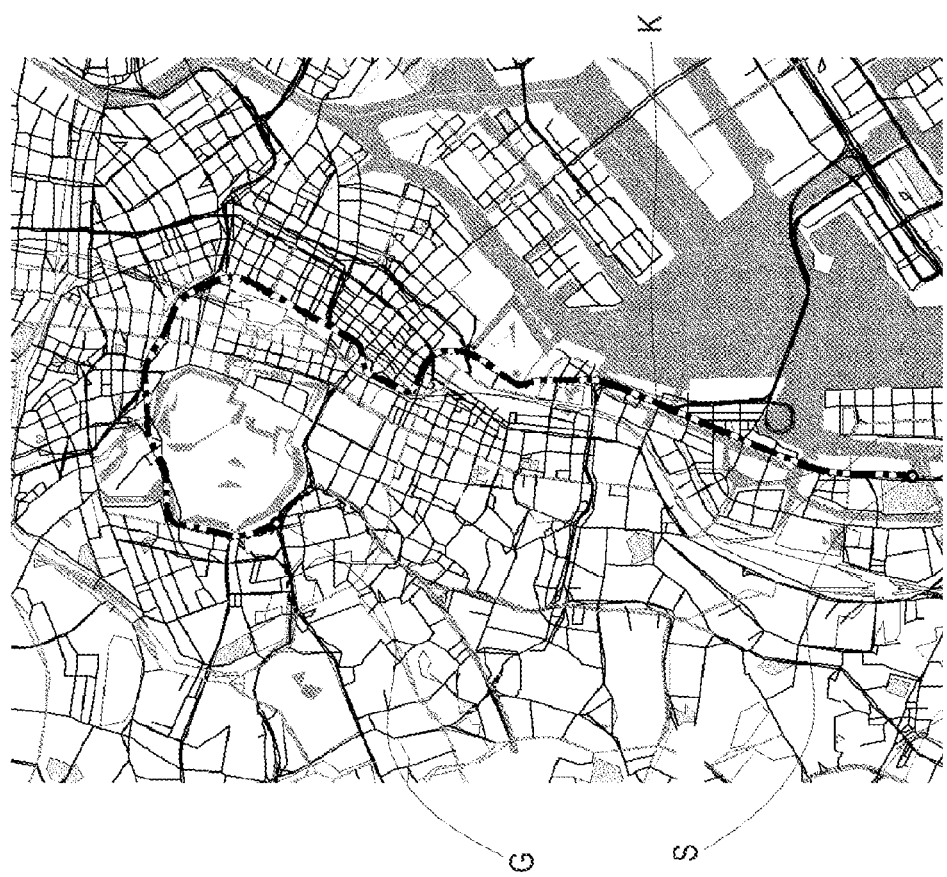
COMPARISON OF PATH ON MAP WITH TRAVEL TRACK

EXAMPLE OF USE IN ANOTHER EMBODIMENT

VELOCITY CALCULATION DEVICE, VELOCITY CALCULATION METHOD, AND NAVIGATION DEVICE

CROSS-REFERENCE TO RELATED APPLICATIONS

The present application is a continuation of U.S. application Ser. No. 12/583,666, filed on Aug. 24, 2009, which claims the benefit of Japanese Patent No. P2008-221713, filed on Aug. 29, 2008 the disclosures of which are incorporated herein by reference.

BACKGROUND OF THE INVENTION

Field of the Invention

The present invention relates to a velocity calculation device, a velocity calculation method, and a navigation device suitably applied, for example, to a portable navigation device.

Description of Related Art

A navigation device in the related art is configured to receive positioning signals (hereinafter, referred to also as GPS signals) from a plurality of GPS (Global Positioning System) satellites and to calculate a current position of the vehicle on the basis of the GPS signals.

The navigation device as above, however, fails to receive GPS signals from the GPS satellites when the vehicle on which is mounted the navigation device goes, for example, into a tunnel or an underground parking and thereby becomes unable to calculate a current position of the vehicle on the basis of the GPS signals.

To avoid such an inconvenience, there is a type of navigation device configured to calculate a velocity in the travel direction on the basis of the acceleration in the horizontal direction orthogonal to the travel direction of the vehicle and an angular velocity about the vertical axis orthogonal to the travel direction at the time of cornering, and to calculate a current position on the basis of the velocity in the travel direction even in a case where the navigation device fails to receive the GPS signals. An example of such a navigation device is disclosed in JP-A-2008-76389.

SUMMARY OF THE INVENTION

The navigation device as described above is able to calculate the velocity in the travel direction at the time of cornering but it is unable to calculate the velocity in the travel direction at the time of straight-ahead driving. The navigation device therefore has a problem that the velocity in the travel direction is not necessarily calculated in all the road environments.

Thus, it is desirable to provide a velocity calculation device, a velocity calculation method, and a navigation device capable of calculating the velocity of the vehicle at high accuracy in all the road environments under any circumstance.

According to an embodiment of the present invention, there is provided a velocity calculation device including: a vertical direction acceleration detection portion that is mounted on a vehicle and detects an acceleration in a vertical direction generated correspondingly to undulation of a road surface; a horizontal direction angular velocity detection portion that is mounted on the vehicle and detects an angular velocity about a horizontal axis orthogonal to a travel direction of the vehicle generated correspondingly to the undulation of the road surface; and a velocity calculation portion that calculates a velocity in the travel direction of the vehicle on the basis of the acceleration in the vertical direction and the angular velocity about the horizontal axis.

According to another embodiment of the present invention, there is provided a velocity calculation method including the steps of: detecting an acceleration in a vertical direction generated in a vehicle correspondingly to undulation of a road surface; detecting an angular velocity about a horizontal axis orthogonal to a travel direction of the vehicle generated in the vehicle correspondingly to the undulation of the road surface; and calculating a velocity in the travel direction of the vehicle on the basis of the acceleration in the vertical direction and the angular velocity about the horizontal axis.

According to another embodiment of the present invention, there is provided a navigation device including: a vertical direction acceleration detection portion that detects an acceleration in a vertical direction generated in a vehicle correspondingly to undulation of a road surface; a horizontal direction angular velocity detection portion that detects an angular velocity about a horizontal axis orthogonal to a travel direction of the vehicle generated in the vehicle correspondingly to the undulation of the road surface; a velocity calculation portion that calculates a velocity in the travel direction of the vehicle on the basis of the acceleration in the vertical direction and the angular velocity about the horizontal axis; a vertical direction angular velocity detection portion that calculates an angular velocity about a vertical axis that is perpendicular to the travel direction; an angle calculation portion that calculates an angle by which the vehicle has turned on the basis of the angular velocity about the vertical axis; and a position calculation portion that calculates a position of the vehicle on the basis of the velocity in the travel direction calculated by the velocity calculation portion and the angle calculated by the angle calculation portion.

According to the embodiments of the present invention, it becomes possible to detect the acceleration in the vertical direction and the angular velocity about the horizontal axis orthogonal to the travel direction both generated correspondingly to undulation of the road surface and to calculate the velocity in the travel direction of the vehicle on the basis of the acceleration in the vertical direction and the angular velocity about the horizontal axis in all the road environments.

According to the embodiments of the present invention, by detecting the acceleration in the vertical direction and the angular velocity about the horizontal axis orthogonal to the travel direction both generated correspondingly to undulation of the road surface and by calculating the velocity in the travel direction of the vehicle on the basis of the acceleration in the vertical direction and the angular velocity about the horizontal axis, it becomes possible to provide a velocity calculation device, a velocity calculation method, and a navigation device capable of calculating the velocity of the vehicle at high accuracy in all the road environments under any circumstance.

BRIEF DESCRIPTION OF THE DRAWINGS

FIG. 1A and FIG. 1B are diagrams schematically showing states where a vehicle is traveling on concave and convex road surfaces, respectively;

FIG. 10A and FIG. 10B are diagrams schematically showing states of a road surface angle at a low velocity;

FIG. 11A and FIG. 11B are diagrams schematically showing states of the road angle at a high velocity;

FIG. 15A through FIG. 15H are diagrams schematically showing the additive angular velocities Fourier transformed in every 4096 data points;

FIG. 16A through FIG. 16H are diagrams schematically showing the additive angular velocities Fourier transformed in every 4096 data points;

FIG. 17A through FIG. 17D are diagrams schematically showing a comparison of the low-pass filter processing on the additive acceleration;

FIG. 18A through FIG. 18D are diagrams schematically showing a comparison of the low-pass filter processing on the additive angular velocity;

FIG. 20A and FIG. 20B are diagrams schematically showing a relation of the front acceleration and the rear acceleration at a medium velocity and a high velocity;

FIG. 21A through FIG. 21F are diagrams schematically showing examples of simulations of an acceleration, a pitch rate, and a velocity at three mount positions;

FIG. 25 is a flowchart used to describe a current position calculation processing procedure using velocity calculation processing;

FIG. 26A and FIG. 26B are diagrams schematically showing examples of measurement results of an acceleration, an angular velocity, and a velocity;

FIG. 33A through FIG. 33C are diagrams schematically showing a comparison (2) of the measurement result with the reference at a curve;

FIG. 35A and FIG. 35B are diagrams schematically showing a comparison of a path on a map with a travel track;

DESCRIPTION OF THE PREFERRED EMBODIMENTS

Figure 2:
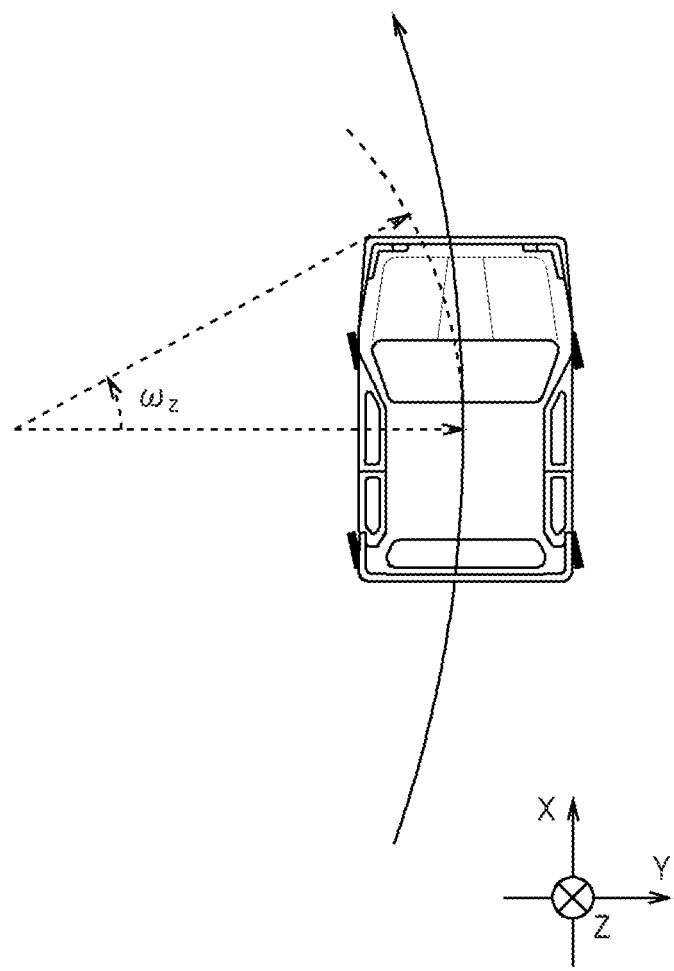
FIG. 2 is a diagram schematically showing a state where the vehicle is traveling along a curve.

Hereinafter, embodiments of the present invention will be described in detail with reference to the drawings.

(1) Fundamental Principle

In embodiments of the present invention, a portable navigation device (hereinafter, referred to also as the PND (Personal Navigation Device)) is used as a navigation device, and the fundamental principle to calculate a velocity and a current position of the vehicle using the PND will be described.

(1-1) Velocity Calculation Principle

Practically, the vehicle seldom travels on a flat road while it is traveling on roads. The vehicle actually travels on a road in a concave shape when viewed as a whole as is shown in FIG. 1A and a road in a convex shape when viewed as a while as is shown in FIG. 1B.

In the coordinate system of the vehicle used herein, the X axis indicates the front-rear direction of the vehicle, the Y axis indicates the horizontal direction orthogonal to the X axis, and the Z axis indicates the top-bottom direction.

When the vehicle travels on a concave road (FIG. 1A), the PND mounted, for example, on the dashboard of the vehicle detects a downward acceleration $\alpha_z$ along the Z axis using a triaxial acceleration sensor provided to the PND at the sampling frequency, for example, of 50 [Hz].

The PND also detects an angular velocity (hereinafter, referred to also as the pitch rate) $\omega_y$ about the Y axis orthogonal to the travel direction using a Y axis gyro sensor provided to the PND at the sampling frequency of 50 [Hz].

Herein, for the PND, it is defined that the downward acceleration $\alpha_z$ along the Z axis is the positive and the pitch rate $\omega_y$ when a virtual circle formed along the concave road surface as shown in FIG. 1A undergoes an upward longitudinal rotation with respect to the travel direction is the positive.

The PND is configured to calculate a velocity V in the travel direction 50 times per second in accordance with Equation (1) below using the acceleration $\alpha_z$ detected by the triaxial acceleration sensor and the pitch rate $\omega_y$ detected by the Y axis gyro sensor.

$$V = \frac{\alpha_z}{\omega_y} \quad (1)$$

When the vehicle travels on a convex road (FIG. 1B), the PND detects an upward acceleration $\alpha_z'$ along the Z axis using the triaxial acceleration sensor provided to the PND at the sampling frequency, for example, of 50 [Hz] and also detects a pitch rate $\omega_y'$ about the Y axis using the Y axis gyro sensor provided to the PND at the sampling frequency, for example, of 50 [Hz].

The PND is configured to calculate a velocity V' in the travel direction 50 times per second in accordance with Equation (2) below using the acceleration $\alpha_z'$ detected by the triaxial acceleration sensor and the pitch rate $\omega_y'$ detected by the Y axis gyro sensor.

$$V' = \frac{\alpha_z'}{\omega_y'} \quad (2)$$

Herein, for ease of description, the negative acceleration $\alpha_z$ is described as the acceleration $\alpha_z'$. The triaxial acceleration sensor actually detects the acceleration $\alpha_z'$ as a negative value of the acceleration $\alpha_2$. The same can be said with the pitch rate $\omega_y'$. In other words, although the negative pitch rate $\omega_y$ is described as the pitch rate $\omega_y'$, the Y axis gyro sensor actually detects the pitch rate $\omega_y'$ as a negative value of the pitch rate $\omega_y$. Accordingly, the velocity V' is actually calculated as the velocity V.

(1-2) Current Position Calculation Principle

The current position calculation principle to calculate a current position on the basis of the velocity V calculated using the velocity calculation principle described above and the angular velocity about the Z axis will now be described.

As is shown in FIG. 2, the PND detects an angular velocity (hereinafter, referred to also as the yaw rate) $\omega_z$ about the Z axis when the vehicle is turning to the left using a Z axis gyro sensor provided to the PND at the sampling frequency, for example, of 50 [Hz].

Figure 3:
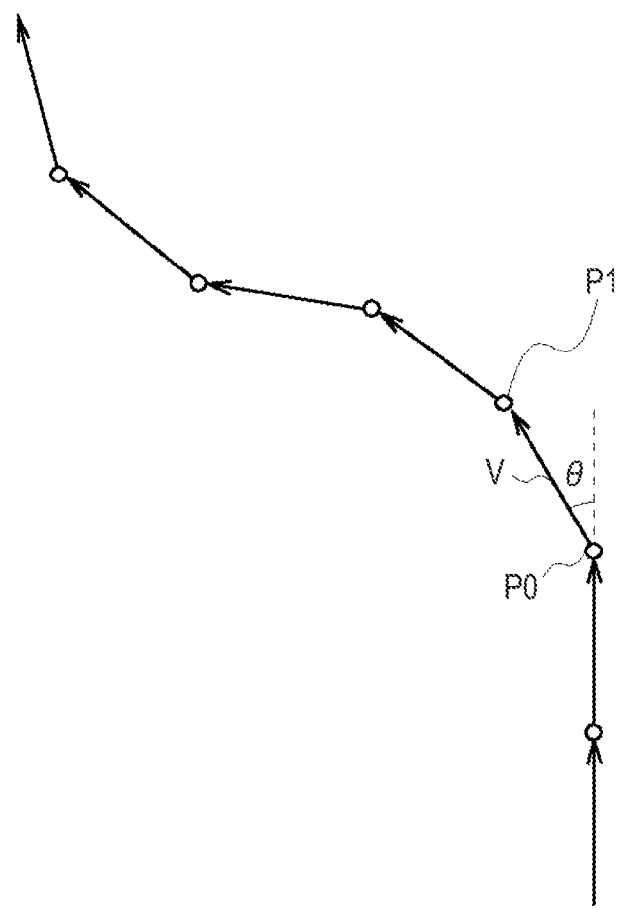
FIG. 3 is a diagram schematically showing a current position calculation method using a velocity and an angle.

The PND then finds, as is shown in FIG. 3, an amount of change from the last position P0 to the current position P1 on the basis of the velocity V at the last position P0 and an angle θ obtained by multiplying the yaw rate $\omega_z$ detected by the gyro sensor by a sampling cycle (herein, 0.02 [s]). The PND is configured to calculate the current position P1 by adding the amount of change to the last position P0.

(2) Configuration of PND

A concrete configuration of a car navigation device that calculates a velocity and a current position of the vehicle using the fundamental principle according an embodiment of the present invention will now be described.

(2-1) Outward Appearance Configuration of PND

Figure 4:
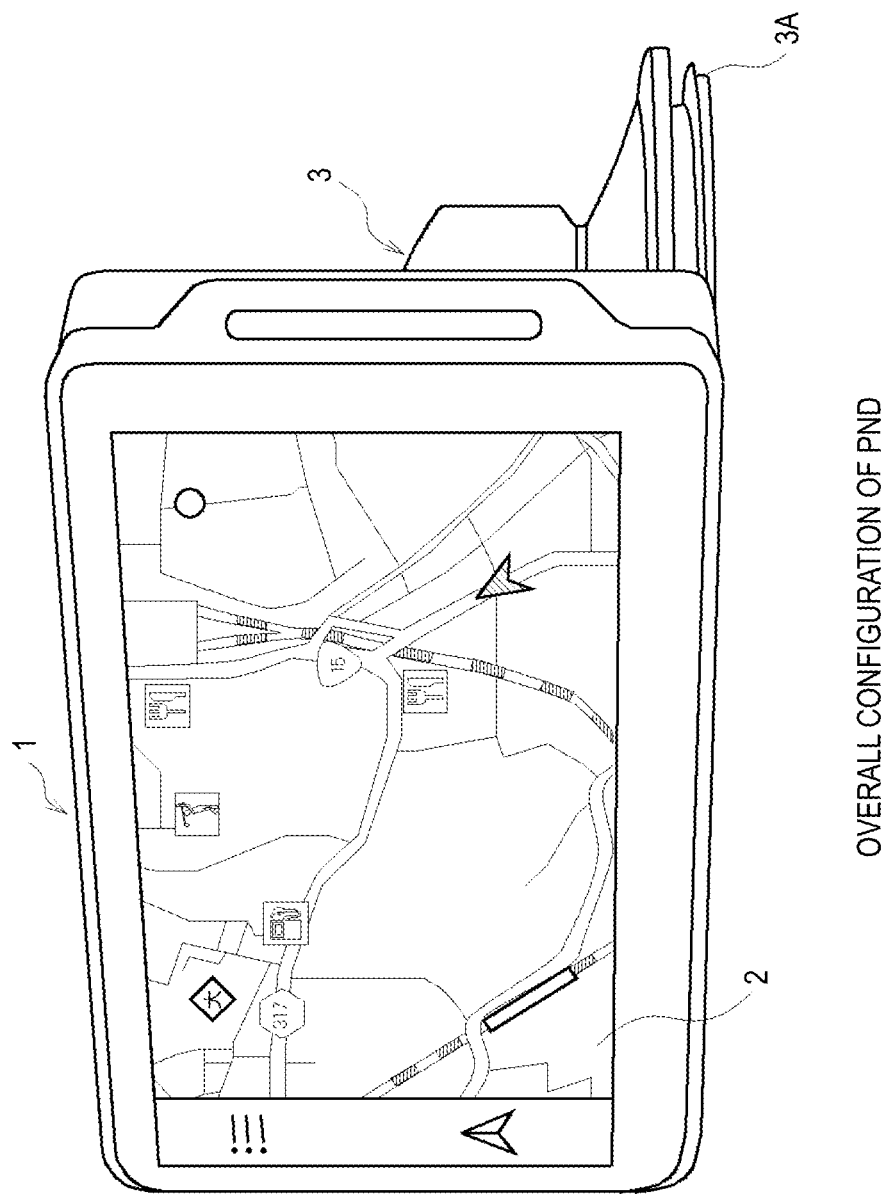
FIG. 4 is a diagram schematically showing the overall configuration of a PND.

As is shown in FIG. 4, a PND 1 is provided with a display portion 2 on the front face of the PND 1 and is configured to display a map image or the like corresponding to map data stored, for example, in an internal non-volatile memory (not shown) of the PND 1 on the display portion 2.

The PND 1 is held by a cradle 3 attached onto the dashboard of the vehicle via a suction disc 3A and the PND 1 and the cradle 3 are mechanically and electrically connected to each other.

The PND 1 therefore operates on source power supplied from the battery of the vehicle via the cradle 3, and when removed from the cradle 3, it operates in an independent state on power supplied from the internal battery.

Figure 5:
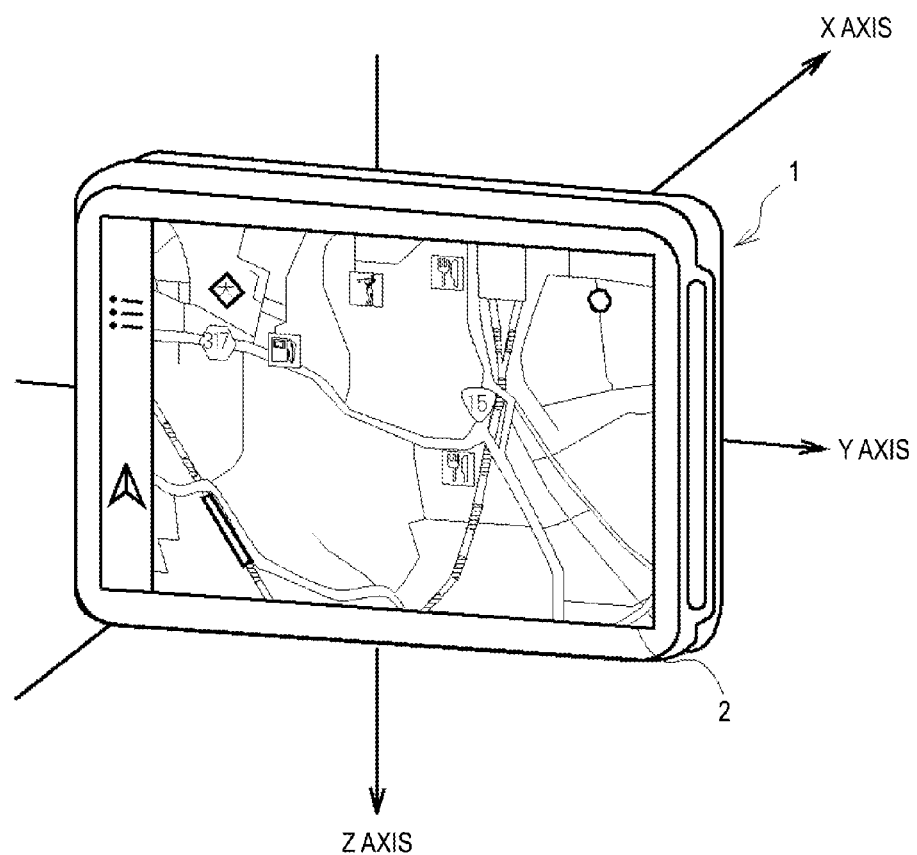
FIG. 5 is a diagram schematically showing definitions of the coordinate system of the PND.

The PND 1 is provided in such a manner that the display portion 2 is substantially perpendicular to the travel direction of the vehicle. As is shown in FIG. 5, in the coordinate system of the PND 1 in this instance, the X axis indicates the front-rear direction (travel direction) of the vehicle, the Y axis indicates the horizontal direction orthogonal to the X axis, and the Z axis indicates the top-bottom direction.

In this coordinate system, the travel direction of the vehicle is defined as the positive of the X axis, the right direction as the positive of the Y axis, and the downward direction as the positive of the Z axis.

(2-2) Sensor Configuration of PND

Figure 6:
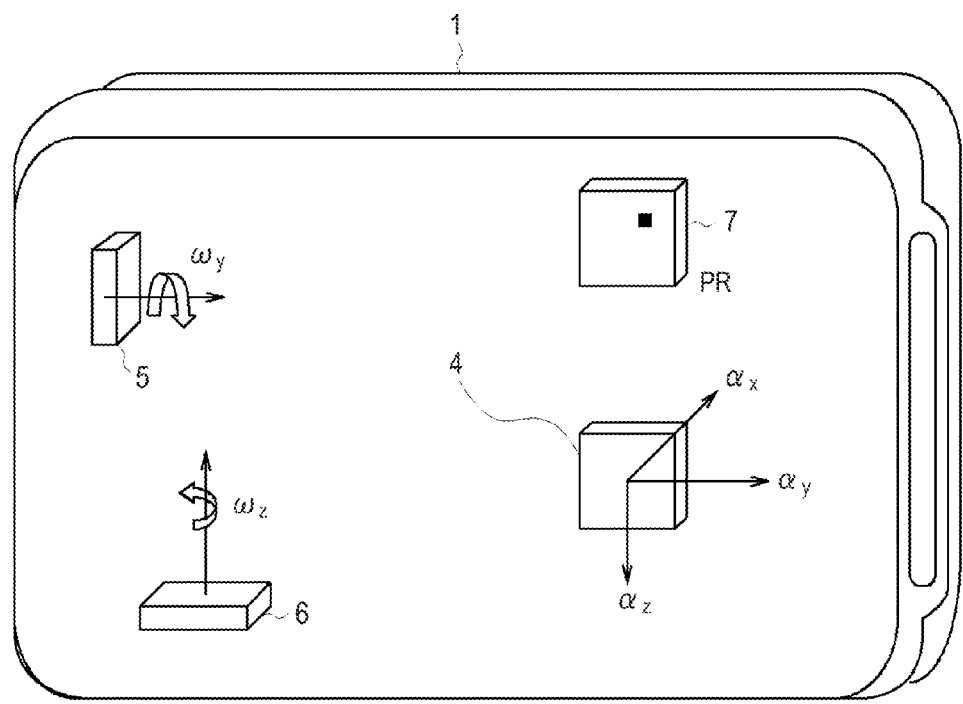
FIG. 6 is a diagram schematically showing a sensor configuration of the PND.

As is shown in FIG. 6, the PND 1 includes a triaxial acceleration sensor 4, a Y axis gyro sensor 5, a Z axis gyro sensor 6, and a pressure sensor 7, all of which are provided inside.

The triaxial acceleration sensor 4 is configured to detect each of an acceleration $\alpha_x$ along the X axis, an acceleration $\alpha_y$ along the Y axis, and an acceleration $\alpha_z$ along the Z axis as a voltage value.

The Y axis gyro sensor 5, the Z axis gyro sensor 6, and the pressure sensor 7 are configured to detect a pitch rate $\omega_y$ about the Y axis, a yaw rate $\omega_z$ about the Z axis, and an ambient air pressure PR, respectively, as voltage values.

(2-3) Circuit Configuration of PND

Figure 7:
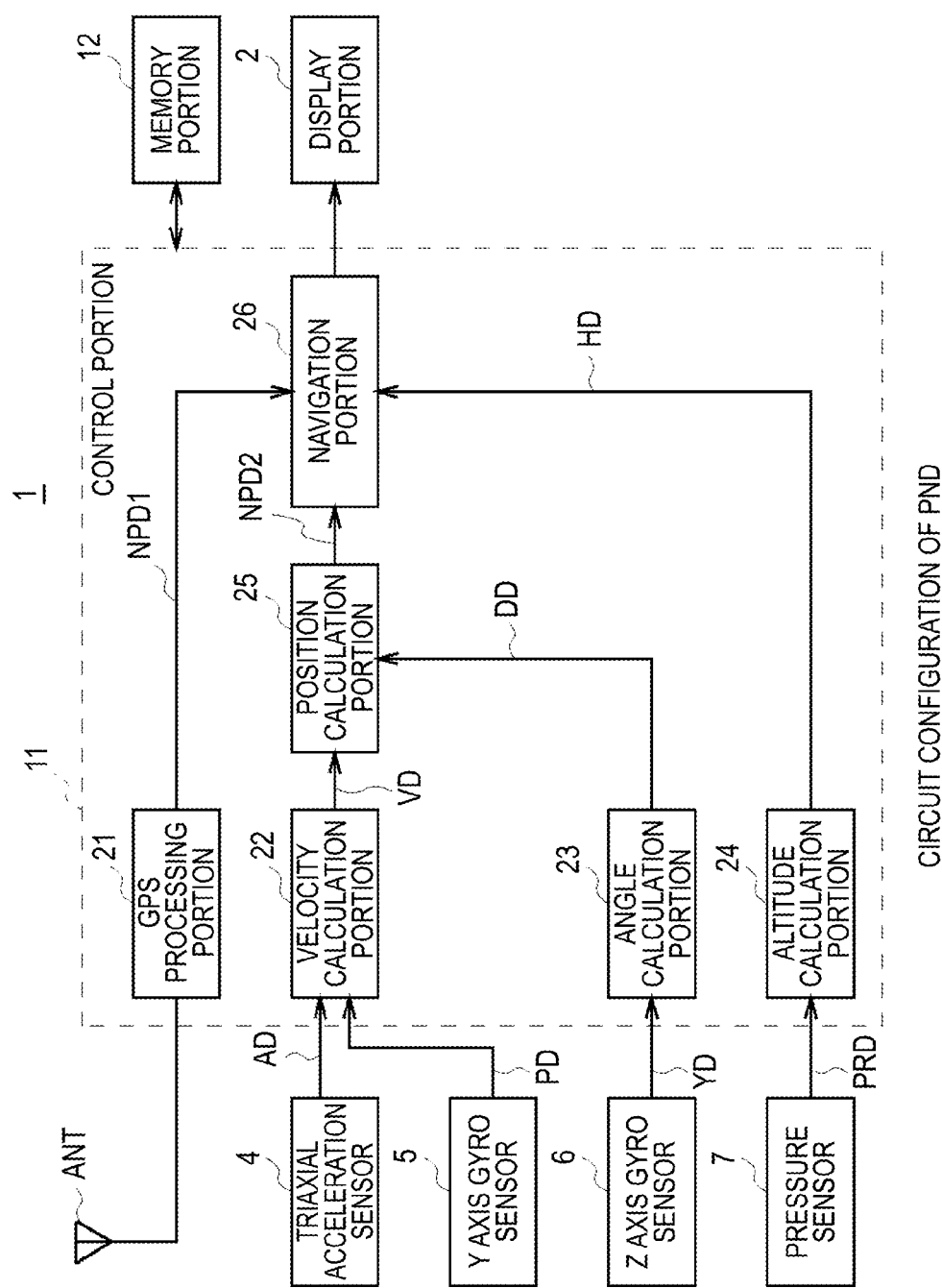
FIG. 7 is a diagram schematically showing a circuit diagram of the PND.

As is shown in FIG. 7, a control portion 11 of the PND 1 is formed of a CPU (Central Processing Unit), and is configured to perform overall integrated control by a basic program read out from a memory portion 12 formed, for example, of a non-volatile memory.

The PND 1 is also configured to perform velocity calculation processing described below according to various application programs read out by the control portion 11 from the memory portion 12.

The control portion 11 is configured to function as a GPS processing portion 21, a velocity calculation portion 22, an angle calculation portion 23, an altitude calculation portion 24, a position calculation portion 25, and a navigation portion 26 when performing the velocity calculation processing and the like.

In the PND 1, GPS signals from a plurality of GPS satellites received at a GPS antenna ANT are sent to the GPS processing portion 21 of the control portion 11.

The GPS processing portion 21 acquires current position data NPD1 obtained by precisely positioning a current position of the vehicle on the basis of track data obtained by demodulating each of a plurality of GPS signals and distance data about distances from a plurality of GPS satellites to the vehicle, and sends the acquired data to the navigation portion 26.

The navigation portion 26 is configured to read out map data of the periphery including the current position of the vehicle on the basis of the current position data NPD1 from the memory portion 12 so as to create a map image including the current position, and to display the map image by outputting the map image to the display portion 2.

Incidentally, the triaxial acceleration sensor 4 detects the accelerations $\alpha_x$, $\alpha_y$, and $\alpha_z$ at the sampling frequency, for example, of 50 [Hz]. Of the accelerations $\alpha_x$, $\alpha_y$, and $\alpha_z$, it sends acceleration data AD indicating the acceleration $\alpha_z$ to the acceleration calculation portion 22 of the control portion 11.

The Y axis gyro sensor 5 detects the pitch rate $\omega_y$ at the sampling frequency, for example, of 50 [Hz] and sends pitch rate data PD indicating the pitch rate $\omega_y$ to the velocity calculation portion 22 of the control portion 11.

The velocity calculation portion 22 calculates the velocity V 50 times per second using Equation (1) above on the basis of the acceleration $\alpha_z$ corresponding to the acceleration data AD supplied from the triaxial acceleration sensor 4 and the pitch rate $\omega_y$ corresponding to the pitch rate data PD supplied from the Y axis gyro sensor 5, and sends velocity data VD indicating the velocity V to the position calculation portion 25.

The Z axis gyro sensor 6 detects the yaw rate $\omega_z$ at the sampling frequency, for example, of 50 [Hz] and sends yaw rate data YD indicating the yaw rate $\omega_z$ to the angle calculation portion 23 of the control portion 11.

The angle calculation portion 23 calculates an angle $\theta$ when the vehicle is turning to the right or the left by multiplying the yaw rate $\omega_z$ corresponding to the yaw rate data YD supplied from the Z axis gyro sensor 6 by a sampling cycle (herein, 0.02 [s]) and sends angle data DD indicating the angle $\theta$ to the position calculation portion 25.

The position calculation portion 25 finds an amount of change from the last position P0 to the current position P1 as shown in FIG. 3 on the basis of the velocity V corresponding to the velocity data VD supplied from the velocity calculation portion 22 and the angle $\theta$ corresponding to the angle data DD supplied from the angle calculation portion 23. The position calculation portion 25 calculates the current position P1 by adding the amount of change to the last position P0 and sends current position data NPD2 indicating the current position P1 to the navigation portion 26.

Meanwhile, the pressure sensor 7 detects an ambient pressure PR at the sampling frequency, for example, of 50 [Hz] and sends pressure data PRD indicating the pressure PR to the altitude calculation portion 24.

The altitude calculation portion 24 calculates an altitude of the vehicle on the basis of the pressure PR corresponding to the pressure data PRD supplied from the pressure sensor 7 and sends altitude data HD indicating the altitude to the navigation portion 26.

The navigation portion 26 is configured to read out map data of the periphery including the current position of the vehicle from the memory portion 12 on the basis of the current position data NPD2 supplied from the position calculation portion 25 and the altitude data HD supplied from the altitude calculation portion 24 so as to create a map image including the current position, and to display the map image by outputting the map image to the display portion 2.

(3) Velocity Calculation Processing

The velocity calculation processing to calculate the velocity V by the velocity calculation portion 22 on the basis of the acceleration $\alpha_z$ corresponding to the acceleration data AD supplied from the triaxial acceleration sensor 4 and the pitch rate $\omega_y$ corresponding to the pitch rate data PD supplied from the Y axis gyro sensor 5 will now be described in detail.

Figure 8:
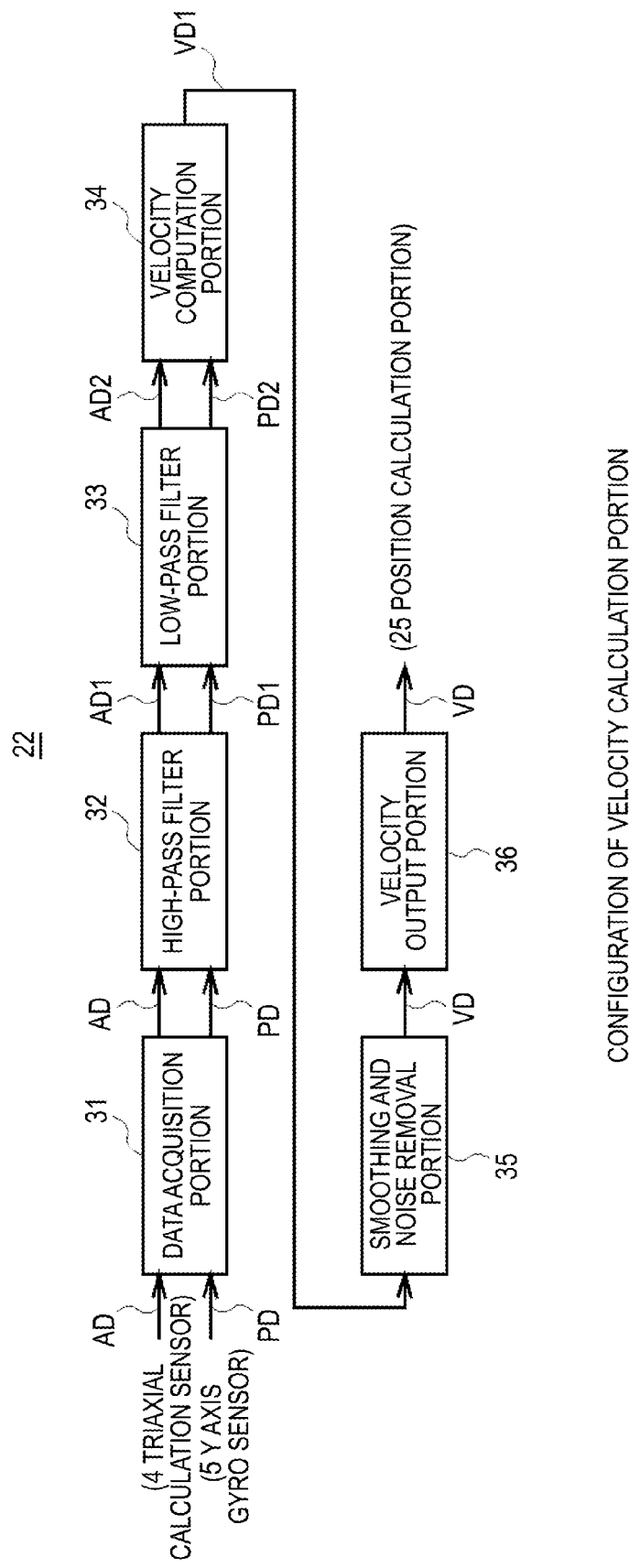
FIG. 8 is a diagram schematically showing the configuration of a velocity calculation portion.

When performing the velocity calculation processing, as is shown in FIG. 8, the velocity calculation portion 22 functions as a data acquisition portion 31, a high-pass filter portion 32, a low-pass filter portion 33, a velocity computation portion 34, a smoothing and noise removal portion 35, and a velocity output portion 36.

The data acquisition portion 31 of the velocity calculation portion 22 acquires the acceleration data AD supplied from the triaxial acceleration sensor 4 and the pitch rate data PD supplied from the Y axis gyro sensor 5 and sends the acceleration data AD and the pitch rate data PD to the high-pass filter portion 32.

The high-pass filter portion 32 cuts off direct current components of the acceleration data AD and the pitch rate data PD supplied from the data acquisition portion 31 and sends the resulting acceleration data AD1 and pitch rate data PD1 to the low-pass filter portion 33.

The low-pass filter portion 33 applies low-pass filter processing described below to the acceleration data AD1 and the pitch rate data PD1 supplied from the high-pass filter portion 32 and sends the resulting acceleration data AD2 and pitch rate data PD2 to the velocity computation portion 34.

The velocity computation portion 34 applies velocity computation processing described below to the acceleration data AD2 and the pitch rate data PD2 supplied from the low-pass filter portion 33 and sends the resulting velocity data VD1 to the smoothing and noise removal portion 35.

The smoothing and noise removal portion 35 applies smoothing and noise removal processing described below to the velocity data V1 supplied from the velocity computation portion 34 and sends the resulting velocity data VD to the velocity output portion 36.

The velocity output portion 36 outputs the velocity data VD supplied from the smoothing and noise removal portion 35 to the position calculation portion 25.

As has been described, the velocity calculation portion 22 is configured to calculate the velocity V of the vehicle on the basis of the acceleration data AD supplied from the triaxial acceleration sensor 4 and the pitch rate data PD supplied from the Y axis gyro sensor 5.

(3-1) Low-Pass Filter Processing

The low-pass filter processing applied by the low-pass filter portion 33 to the acceleration data AD1 and the pitch rate data PD1 supplied from the high-pass filter portion 32 will now be described in detail.

Figure 9:
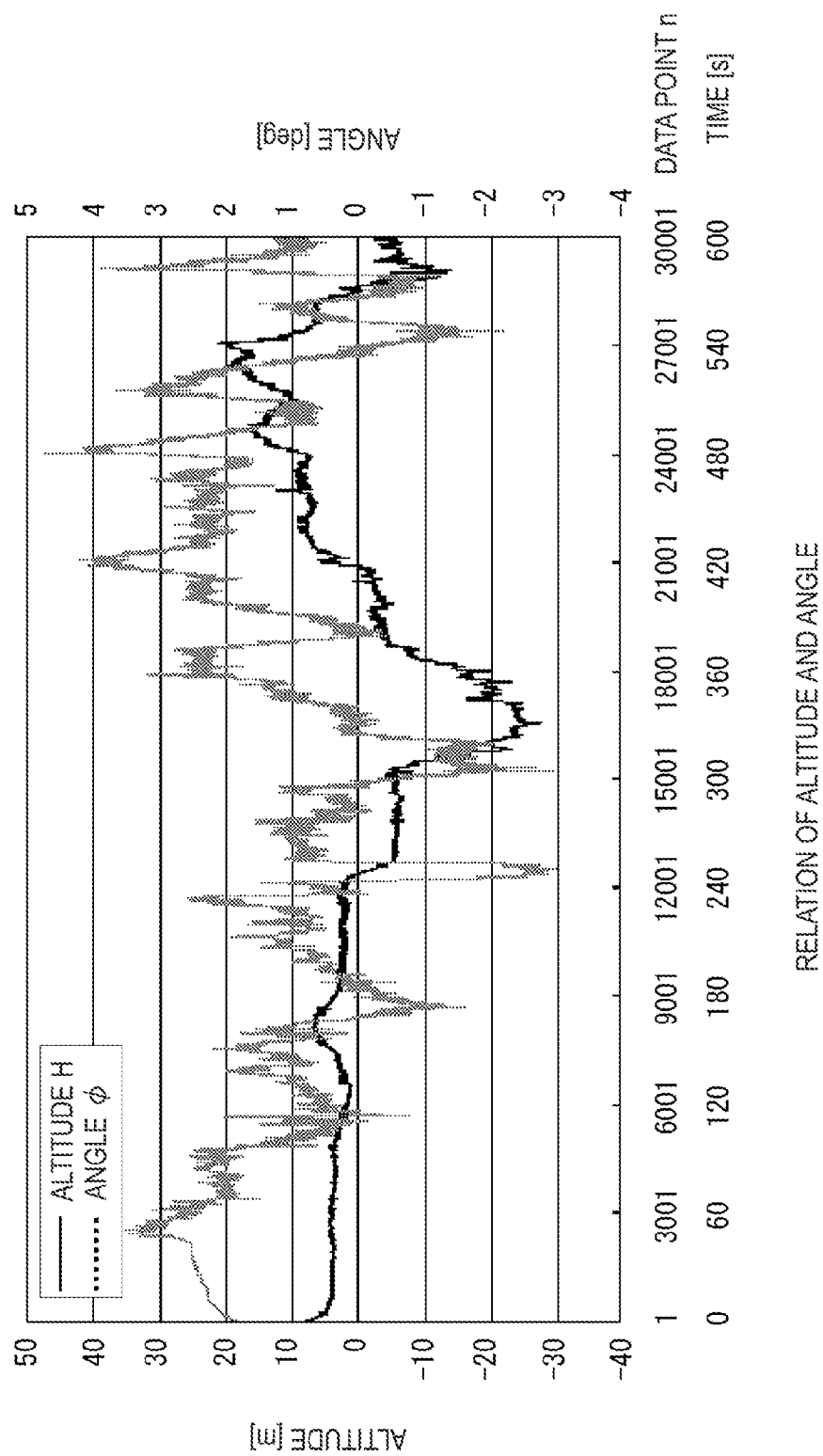
FIG. 9 is a diagram schematically showing a relation of an altitude and an angle.

Incidentally, a relation of an altitude H based on the pressure PR corresponding to the pressure data PND acquired by the pressure sensor 7 and an angle $\phi$ about the Y axis with respect to the horizontal direction based on the pitch rate $\omega_y$ corresponding to the pitch rate data PD acquired by the Y axis gyro sensor 5 is shown in FIG. 9. For the angle $\phi$ referred to herein, it is defined that the upward direction with respect to the travel direction (X axis) is the positive.

As is obvious from a fact in FIG. 9 that when the altitude H lowers abruptly from about data points 12001 (240 [s]), that is, when the vehicle is running down a downhill slope, the angle $\phi$ decreases abruptly from about 0.5 [deg] to about −2.5 [deg], there is a correlation between the altitude H and the angle $\phi$.

When the altitude H changes as above, the angle $\phi$ also changes in association with a change of the altitude H. It is therefore understood that the PND 1 is able to detect undulation of the road surface in the travel direction of the vehicle using the Y axis gyro sensor 5.

The angle $\phi$ in FIG. 9 alone is shown in FIG. 10A. FIG. 10B shows the angle $\phi$ from data points 5001 to data points 6001 of FIG. 10A while the vehicle is traveling at a low velocity lower than 20 [km] per hour. As is obvious also from FIG. 10B, the angle φ oscillates one or two time per second.

Hence, the PND 1 mounted on the vehicle detects the angle φ based on the pitch rate $\omega_y$ corresponding to the pitch rate data PD acquired by the Y axis gyro sensor 5 as an oscillation of 1 to 2 [Hz] while the vehicle is traveling at a low velocity lower than 20 [km] per hour.

Also, as with FIG. 10A, FIG. 11A shows the angle φ of FIG. 9 alone. FIG. 11B shows the angle φ from data points 22001 to data points 23001 of FIG. 11A while the vehicle is traveling at a high velocity of 60 [km] per hour or higher.

According to these drawings, the PND 1 also detects the angle φ based on the pitch rate $\omega_y$ corresponding to the pitch rate data PD acquired by the Y axis gyro sensor 5 as an oscillation of 1 to 2 [Hz] while the vehicle is traveling at a high velocity of 60 [km] per hour or higher.

Figure 12:
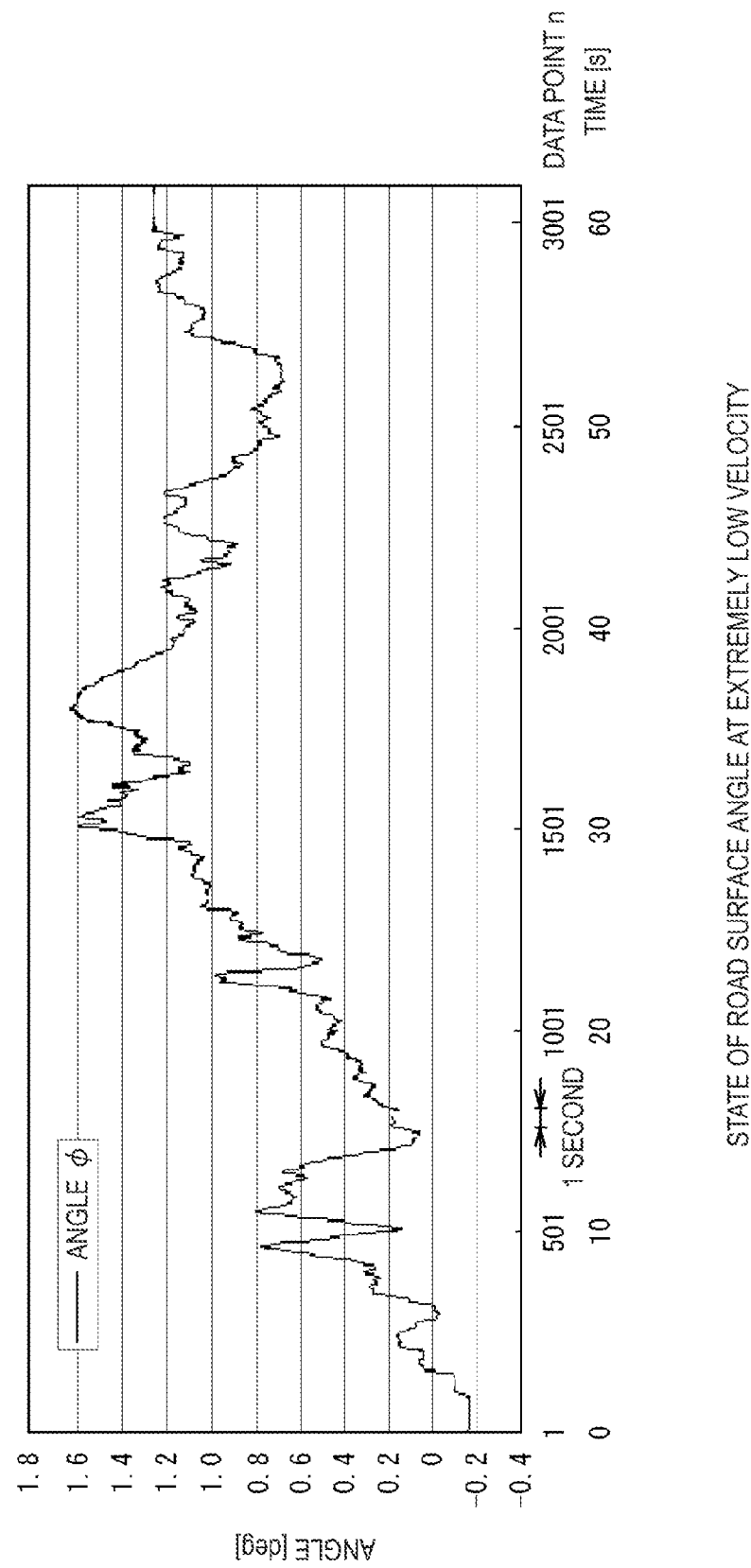
FIG. 12 is a diagram schematically showing a state of the road surface angle at an extremely low velocity.

Further, as is shown in FIG. 12, the PND 1 also detects the angle φ based on the pitch rate $\omega_y$ corresponding to the pitch rate data PD acquired by the Y axis gyro sensor 5 as an oscillation of 1 to 2 [Hz] while the vehicle is traveling at an extremely low velocity lower than 10 [km] per hour.

Hence, when the PND 1 detects the pitch rate $\omega_y$ from the Y axis gyro sensor 5, it detects the pitch rate $\omega_y$ as an oscillation of 1 to 2 [Hz] regardless of the travel velocity of the vehicle.

Figure 13:
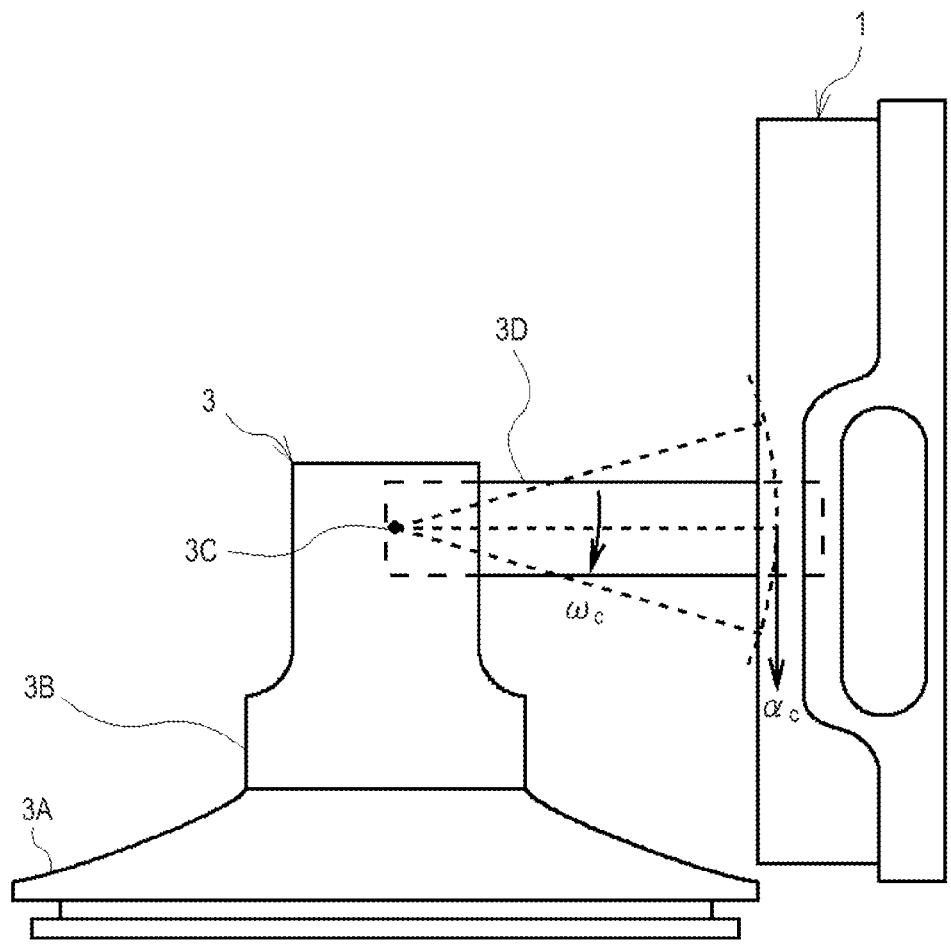
FIG. 13 is a diagram schematically showing a state of an oscillation by a cradle.

Incidentally, the PND 1 is held by the cradle 3 attached to the dashboard of the vehicle via the suction disc 3A. As is shown in FIG. 13, the cradle 3 includes a main body portion 3B provided above the suction disc 3A and a PND supporting portion 3D that is supported on a supporting point 3C provided to the main body portion 3B at a predetermined height position at one end and supports the PND 1 at the other end.

Hence, when the vehicle oscillates correspondingly to undulation of the road surface, the PND 1 oscillates in the top-down direction about the supporting point 3C of the PND supporting portion 3D, for example, at the acceleration $\alpha_c$ and the angular velocity $\omega_c$.

The triaxial acceleration sensor 4 therefore actually detects an acceleration (hereinafter, referred to as the additive acceleration) $\alpha_{cz}$ obtained by adding an acceleration $\alpha_c$ associated with an oscillation about the supporting point 3C of the PND supporting portion 3D to the acceleration $\alpha_z$ (FIG. 1) in the Z axis direction generated when the vehicle oscillates correspondingly to undulation of the road surface.

Also, the Y axis gyro sensor 5 actually detects an angular velocity (hereinafter, referred to as the additive angular velocity) $\omega_{cy}$ obtained by adding an angular velocity $\omega_c$ associated with an oscillation about the supporting point 3C of the PND supporting portion 3D to the pitch rate $\omega_y$ (FIG. 1) about the Y axis generated when the vehicle oscillates correspondingly to undulation of the road surface.

The low-pass filter portion 33 therefore actually acquires the acceleration data AD1 indicating the additive acceleration $\alpha_{cz}$ and the pitch rate data PD1 indicating the additive angular velocity $\omega_{cy}$ via the data acquisition portion 31 and the high-pass filter portion 32.

Figure 14:
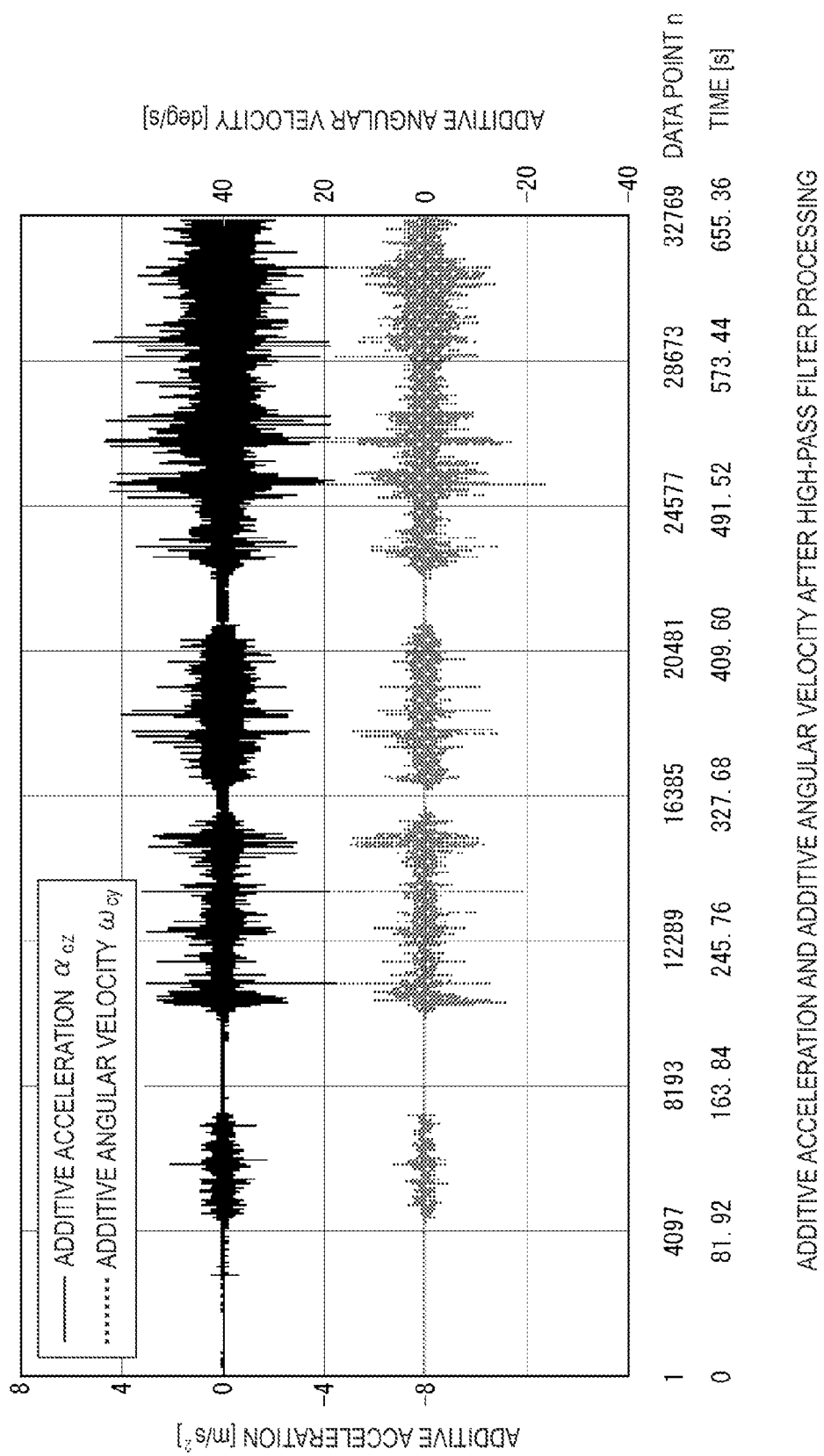
FIG. 14 is a diagram schematically showing an additive acceleration and an additive angular velocity after high-pass filter processing.

The additive acceleration $\alpha_{cz}$ corresponding to the acceleration data AD1 and the additive angular velocity $\omega_{cy}$ corresponding to the pitch rate data PD1 after the high-pass filter processing is applied by the high-pass filter portion 32 are shown in FIG. 14. FIG. 15A through 15H show graphs of the additive angular velocities $\omega_{cy}$ shown in FIG. 14 that are Fourier transformed in every 4096 data points.

To be more concrete, FIG. 15A is a graph of the Fourier transformed additive angular velocity $\omega_{cy}$ from data points 1 to 4096 of FIG. 14. Likewise, FIGS. 15B, 15C, and 15D are graphs of the Fourier transformed additive angular velocities $\omega_{cy}$ from data points 4097 to 8192, from data points 8193 to 12288, and from data points 12289 to 16384 of FIG. 14, respectively.

Also, FIGS. 15E, 15F, 15G, and 15H are graphs of the Fourier transformed additive angular velocities $\omega_{cy}$ from data points 16385 to 20480, from data points 20481 to 24576, from data points 24577 to 28672, and from data points 28673 to 32768 of FIG. 14, respectively.

Of FIGS. 15A through 15H, as are shown noticeably in FIG. 15C through 15H, a frequency component at 1 to 2 [Hz] and a frequency component at about 15 [Hz] indicate large values.

In other words, the PND 1 detects the additive angular velocity $\omega_{cy}$, which is a synthesis of the pitch rate $\omega_y$ oscillating at 1 to 2 [Hz] by undulation of the road surface as described above and the angular velocity $\omega_c$ oscillating at about 15 [Hz] by the cradle 3 holding the PND 1, using the Y axis gyro sensor 5.

Meanwhile, FIGS. 16A through 16H show graphs of the additive accelerations $\alpha_{cz}$ shown in FIG. 14 that are Fourier transformed in every 4096 data points.

To be more concrete, FIG. 16A is a graph of the Fourier transformed additive acceleration $\alpha_{cz}$ from data points 1 to 4096 of FIG. 14. Likewise, FIGS. 16B, 16C, and 16D are graphs of the Fourier transformed additive accelerations $\alpha_{cz}$ from data points 4097 to 8192, from data points 8193 to 12288, and from the data points 12289 to 16384 of FIG. 14, respectively.

Also, FIGS. 16E, 16F, 16G, and 16H are graphs of the Fourier transformed additive accelerations $\alpha_{cz}$ from data points 16385 to 20480, from data points 20481 to 24576, from data points 24577 to 28672, and from data points 28673 to 32768 of FIG. 14, respectively.

Because a frequency component at 1 to 2 [Hz] and a frequency component at about 15 [Hz] are generated in the additive angular velocities $\omega_{cy}$ (FIGS. 15C through 15H), it is anticipated that a frequency component at 1 to 2 [Hz] and a frequency component at about 15 [Hz] are generated also in the additive accelerations $\alpha_{cz}$.

In other words, the PND 1 detects the additive acceleration $\alpha_{cz}$, which is a synthesis of the acceleration $\alpha_z$ oscillating at 1 to 2 [Hz] by undulation of the road surface as described above and the acceleration $\alpha_c$ oscillating at about 15 [Hz] by the cradle 3 holding the PND 1, using the triaxial acceleration sensor 4.

The low-pass filter portion 33 is therefore configured to apply the low-pass filter processing to the acceleration data AD1 and the pitch rate data PD1 supplied from the high-pass filter portion 32 so as to remove the frequency components at about 15 [Hz], that is, the acceleration $\alpha_c$ and the angular velocity $\omega_c$ generated because the PND 1 is held by the cradle 3.

The graph of FIG. 16H is converted to the graph shown in FIG. 17A by using the logarithmic axis as the ordinate. An IIR (Infinite Impulse Response) filter at the cutoff frequency of 2 [Hz] is applied to the additive acceleration $\alpha_{cz}$ from data points 28673 to 32768 two, four, and six times followed by Fourier transformation and the graphs thus obtained are shown in FIGS. 17B, 17C, and 17D, respectively.

Also, the graph of FIG. 15H is converted to the graph of FIG. 18A by using the logarithmic axis as the ordinate. As with the additive acceleration $\alpha_{cz}$, the IIR filter at the cutoff frequency of 2 [Hz] is applied to the additive angular velocity $\omega_{cy}$ from data points 28673 to 32768 two, four, and six times followed by Fourier transformation and the graphs thus obtained are shown in FIGS. 18B, 18C, and 18D, respectively.

As are shown in FIGS. 17B through 17D and FIGS. 18B through 18D, the PND 1 is able to remove frequency components at about 15 [Hz] generated because the PND 1 is held by the cradle 3 by applying the IIR filter at the cutoff frequency of 2 [Hz] to the acceleration data AD1 and the pitch rate data PD1 supplied from the high-pass filter portion 32 four times or more.

Accordingly, the low-pass filter portion 33 according to an embodiment of the present invention applies the IIR filter at the cutoff frequency of 2 [Hz] to the acceleration data AD1 and the pitch rate data PD1 supplied from the high-pass filter portion 32 four times and sends the resulting acceleration data AD2 and the pitch rate data PD2 to the velocity computation portion 34.

The low-pass filter portion 33 is therefore able to extract only the acceleration $\alpha_z$ generated by undulation of the road surface by removing the acceleration $\alpha_c$ associated with an oscillation in the cradle 3 about the supporting point 3C of the PND supporting portion 3D from the additive acceleration $\alpha_{cz}$.

Also, the low-pass filter portion 33 is able to extract only the pitch rate $\omega_y$ generated by undulation of the road surface by removing the angular velocity $\omega_c$ associated with an oscillation in the cradle 3 about the supporting point 3C of the PND supporting portion 3D from the additive angular velocity $\omega_{cy}$.

(3-2) Velocity Computation Processing

The velocity computation processing to calculate the velocity V by the velocity computation portion 34 on the basis of the acceleration data AD2 and the pitch rate data PD2 supplied from the low-pass filter portion 33 will now be described in detail.

Figure 19:
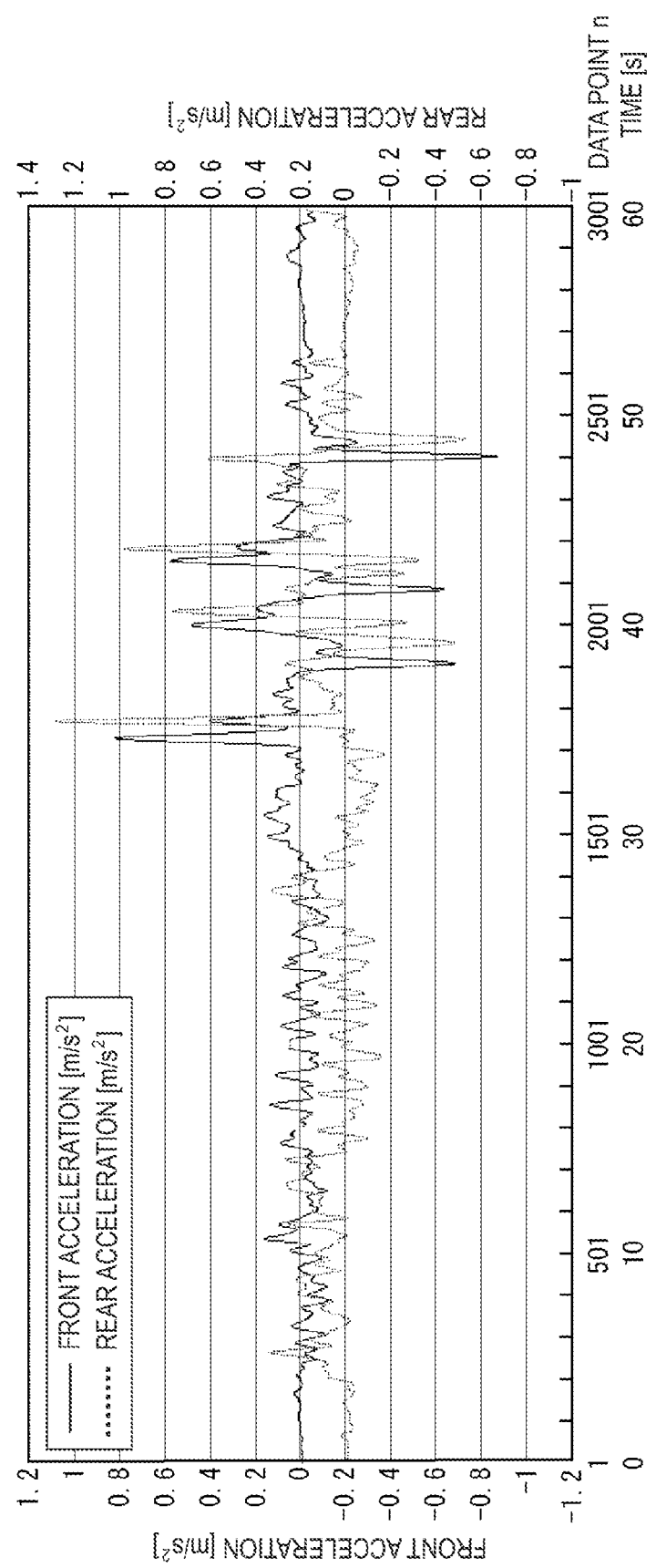
FIG. 19 is a diagram schematically showing a relation of a front acceleration and a rear acceleration at a low velocity.

The accelerations $\alpha_z$ corresponding to the acceleration data AD2 on the front side and the rear side when the vehicle travels, respectively, at a low velocity lower than 20 [km] per hour, a medium velocity lower than 60 [km] per hour, and a high velocity at 60 [km] per hour or higher while the PND 1 is mounted on the dashboard on the front side of the vehicle and in the vicinity of the rear window on the rear side of the vehicle are shown in FIG. 19 and FIGS. 20A and 20B.

In FIG. 19, and FIGS. 20A and 20B, the acceleration $\alpha_z$ detected by the PND 1 mounted on the front side is referred to as the front acceleration and the acceleration $\alpha_z$ detected by the PND 1 mounted on the rear side is referred to as the rear acceleration.

As is obvious from FIG. 19 and FIGS. 20A and 20B, it is understood that the phase of the rear acceleration lags from the front acceleration regardless of the travel velocity of the vehicle. The phase lag is substantially equal to a value obtained by dividing a wheel base, which is a distance between the front wheel shaft and the rear wheel shaft of the vehicle, by the travel velocity.

FIGS. 21A through 21C show examples of the simulation results indicating a relation of the acceleration $\alpha_z$ corresponding to the acceleration data AD2 and the pitch rate $\omega_y$ corresponding to the pitch rate data PD2 when the PND 1 is mounted on the dashboard (corresponding to 30% of the wheel base from the front wheel shaft), at the center, and on the rear wheel shaft of the vehicle, respectively. FIGS. 21D through 21F show the results when the velocity V is calculated in accordance with Equation (1) above on the basis of the acceleration $\alpha_z$ and the pitching rate $\omega_y$ obtained from the simulation results shown in FIGS. 21A through 21C, respectively.

The simulation was performed with the assumption that a vehicle having the wheel base of 2.5 [m] travels at a velocity of 5 [m/s] on the road surface undulating in sine waves having an amplitude of 0.1 [m] and a wavelength of 20 [m].

As is obvious from FIGS. 21A through 21C, the phase of the acceleration $\alpha_z$ lags as the PND 1 is mounted on the vehicle at the position closer to the rear side. Meanwhile, there is no phase lag in the pitch rate $\omega_y$ regardless of the mount position of the PND 1 in the vehicle.

Hence, as is shown in FIG. 21B, in a case where the PND 1 is mounted at the center of the vehicle, there is substantially no phase lag between the acceleration $\alpha_z$ and the pitch rate $\omega_y$. Hence, as is shown in FIG. 21E, the velocity V calculated in accordance with Equation (1) above is substantially constant.

However, as are shown in FIGS. 21A and 21C, when the mount position of the PND 1 shifts forward or rearward with respect to the center of the vehicle, there is a considerable phase lag between the acceleration $\alpha_z$ and the pitch rate $\omega_y$. Accordingly, as are shown in FIGS. 21D and 21F, the velocity V calculated in accordance with Equation (1) above has a significant error in comparison with the velocity V in a case where the PND 1 is mounted at the center of the vehicle (FIG. 21E) because of the phase lag between the acceleration $\alpha_z$ and the pitch rate $\omega_y$.

In particular, because the phase lag between the acceleration $\alpha_z$ and the pitch rate $\omega_y$ becomes large when the velocity V of the vehicle is a low velocity lower than 20 [km] per hour, a calculation error of the velocity V becomes large.

Figure 22:
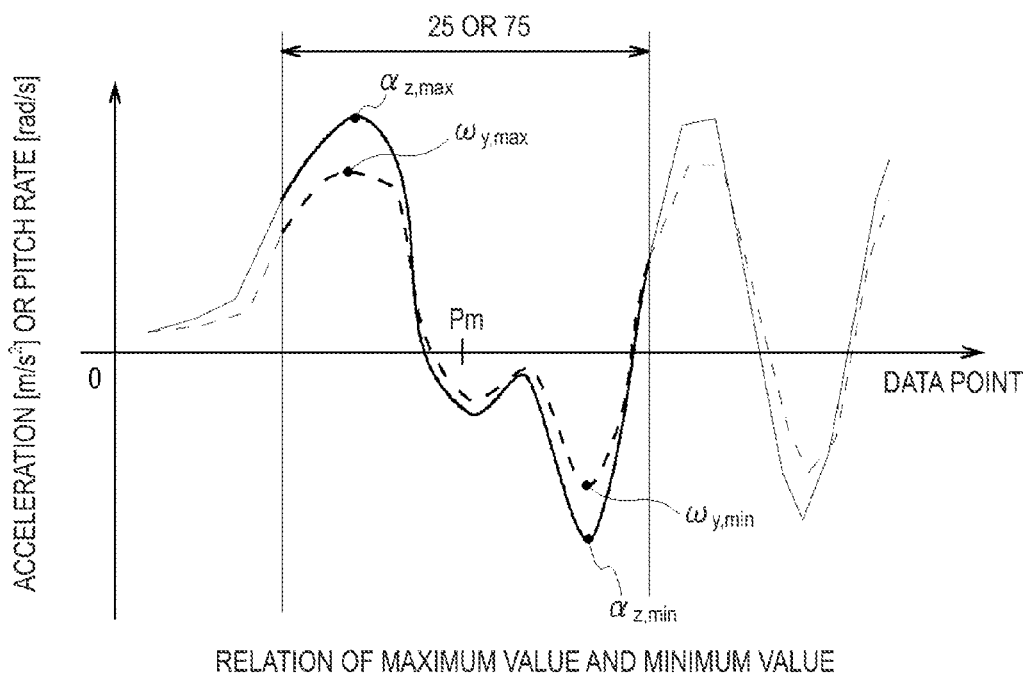
FIG. 22 is a diagram schematically showing a relation of a maximum value and a minimum value.

Accordingly, as is shown in FIG. 22, the velocity computation portion 34 extracts a maximum value and a minimum value of the acceleration $\alpha_z$ corresponding to the acceleration data AD2 supplied from the low-pass filter portion 33 from a range of 25 data points or 75 data points about the data point Pm corresponding to the last position P0 (FIG. 3) as a maximum acceleration $\alpha_{z,max}$ and a minimum acceleration $\alpha_{z,min}$, respectively.

Also, the velocity computation portion 34 extracts a maximum value and a minimum value of the pitch rate $\omega_y$ corresponding to the pitch rate data PD2 supplied from the low-pass filter portion 33 from a range of 25 data points or 75 data points about the data point Pm as a maximum pitch rate $\omega_{y,max}$ and a minimum pitch rate $\omega_{y,min}$, respectively.

The velocity computation portion 34 then calculates the velocity V in the travel direction at the last position P0 (FIG. 3) in according with Equation (3) below, which is a modification of Equation (1) above, using the maximum acceleration $\alpha_{z,max}$ and the minimum acceleration $\alpha_{z,min}$ extracted from the acceleration data AD2 and the maximum pitch rate $\omega_{y,max}$ and the minimum pitch rate $\omega_{y,min}$ extracted from the pitch rate data PD2, and sends the resulting velocity data VD1 to the smoothing and noise removal portion 35:

$$V = \frac{\alpha_{z,max} - \alpha_{z,min}}{\omega_{y,max} - \omega_{y,min}} \quad (3)$$

Accordingly, by calculating the velocity V in accordance with Equation (3) above, even when there is a phase lag between the acceleration $\alpha_z$ corresponding to the acceleration data AD2 and the pitch rate $\omega_y$ corresponding to the pitch rate data PD2, the velocity computation portion 34 extracts the maximum acceleration $\alpha_{z,max}$ and the minimum acceleration $\alpha_{z,min}$ and the maximum pitch rate $\omega_{y,max}$ and the minimum pitch rate $\omega_{y,min}$ from the range wider than the phase lag, and is thereby able to remove the influence of the phase lag.

Figure 23:
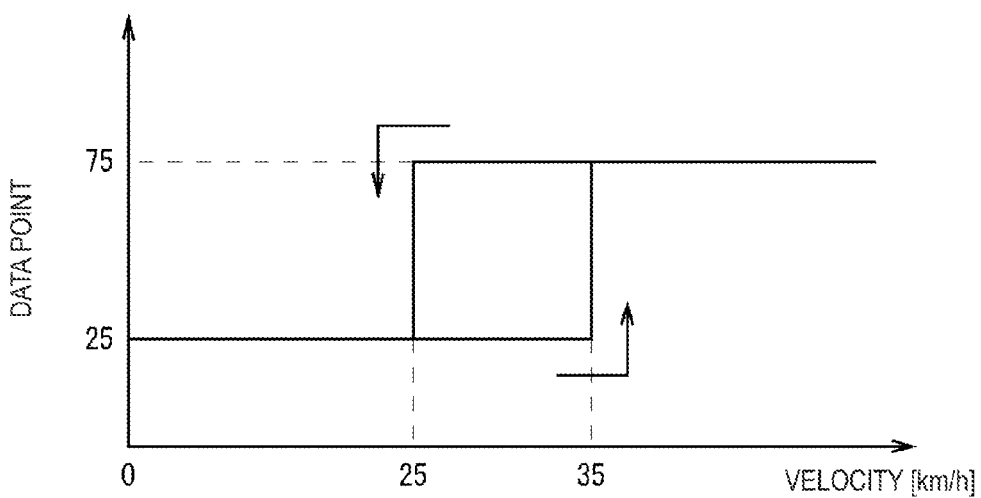
FIG. 23 is a diagram schematically showing a relation of a velocity and a data point number.

Incidentally, as is shown in FIG. 23, when the velocity computation portion 34 calculates the velocity V in the travel direction at the last position P0, it uses a range of 25 data points in a case where the velocity (hereinafter, referred to as the previous value velocity) $V_{n-1}$ at the second last position (not shown) is 0 [km] per hour to 35 [km] per hour, and a range of 75 data points in a case where the previous value velocity $V_{n-1}$ exceeds 35 [km] per hour.

Also, when the velocity computation portion 34 calculates the velocity V in the travel direction at the last position P0, it uses a range of 75 data points in a case where the previous value velocity $V_{n-1}$ is 35 [km] per hour to 25 [km] per hour and a range of 25 data points in a case where the previous value velocity $V_{n-1}$ is lower than 25 [km] per hour.

Hence, the velocity computation portion 34 switches the data ranges of 25 data points and 75 data points in response to the velocity V when extracting the maximum acceleration $\alpha_{z,max}$ and the minimum acceleration $\alpha_{z,min}$ and the maximum pitch rate $\omega_{y,max}$ and the minimum pitch rate $\omega_{min}$.

In this instance, in a case where the velocity V of the vehicle is at a low velocity, for example, 25 [km] per hour or lower, the acceleration $\alpha_z$ and the pitch rate $\omega_y$ vary abruptly with a slight change of the road surface. The velocity computation portion 34 accordingly sets the data range narrower in order to address such an abrupt variance.

By contrast, in a case where the velocity V of the vehicle is 35 [km] per hour or higher, because the influence of the suspension of the vehicle is large and the acceleration $\alpha_z$ and the pitch rate $\omega_y$ vary slowly, the velocity computation portion 34 sets the data range wider in order to address such a slow variance.

In this manner, by switching the data ranges in response to the velocity V of the vehicle when extracting the maximum acceleration $\alpha_{z,max}$ and the minimum acceleration $\alpha_{z,min}$ and the maximum pitch rate $\omega_{y,max}$ and the minimum pitch rate $\omega_{y,min}$, the velocity computation portion 34 becomes able to reflect the conditions of the road surface and the vehicle corresponding to the velocity V. The calculation accuracy of the velocity V can be therefore enhanced.

Also, when extracting the maximum acceleration $\alpha_{z,max}$ and the minimum acceleration $\alpha_{z,min}$ and the maximum pitch rate $\omega_{y,max}$ and the minimum pitch rate $\omega_{y,min}$, the velocity computation portion 34 is configured to provide the hysteresis characteristic such that changes the data range between acceleration and deceleration.

Owing to this configuration, there is no need to frequently switch the data ranges in the vicinity of the switching velocity of the data range necessary in a case where there is no hysteresis characteristic to the data range when the velocity V is calculated. The velocity computation portion 34 is thus able to eliminate a calculation error of the velocity V caused by frequent switching. The calculation accuracy of the velocity V can be therefore enhanced further.

(3-3) Smoothing and Noise Removal Processing

The smoothing and noise removal processing applied by the smoothing and noise removal portion 35 to the velocity data VD1 calculated by the velocity computation portion 34 will now be described in detail.

The smoothing and noise removal portion 35 is configured to first apply the low-pass filter processing using a primary IIR in which the cutoff frequency is variable to the velocity data VD1 supplied from the velocity computation portion 34.

To be more concrete, the smoothing and noise removal portion 35 determines the cutoff frequency on the basis of the previous value velocity $V_{n-1}$ when the velocity V in the travel direction at the last position P0 is calculated.

Herein, in the PND 1, when the travel velocity of the vehicle is a high velocity, for example, at 60 [km] per hour or higher, the velocity V calculated by the velocity computation portion 34 contains considerable noises and the velocity V varies noticeably. To avoid such an inconvenience, the smoothing and noise removal portion 35 uses a low-pass filter set with a low cutoff frequency when the previous value velocity $V_{n-1}$ is 60 [km] per hour or higher.

On the contrary, when the previous value velocity $V_{n-1}$ is lower than 60 [km] per hour, the smoothing and noise removal portion 35 uses a low-pass filter set with a high cutoff frequency.

Incidentally, in a case where the velocity V calculated by the velocity computation portion 34 is an extremely low velocity lower than, for example, 10 [km] per hour, the pitch rate $\omega_y$, which is the value of a denominator in Equation (1) or Equation (3) above, becomes smaller. Consequently, the velocity V calculated in accordance with Equation (1) or Equation (3) above may possibly become extremely larger than an actual value.

To avoid such an inconvenience, the smoothing and noise removal portion 35 acquires the acceleration data AD2 and the pitch rate data PD2 to which the low-pass filter processing has been applied from the low-pass filter portion 33, and in a case where the pitch rate $\omega_y$ corresponding to the pitch rate data PD2 is smaller than a predetermined threshold value, it determines that the velocity V is exceedingly high and sets the velocity V after the low-pass filter processing to 0.

Figure 24A:
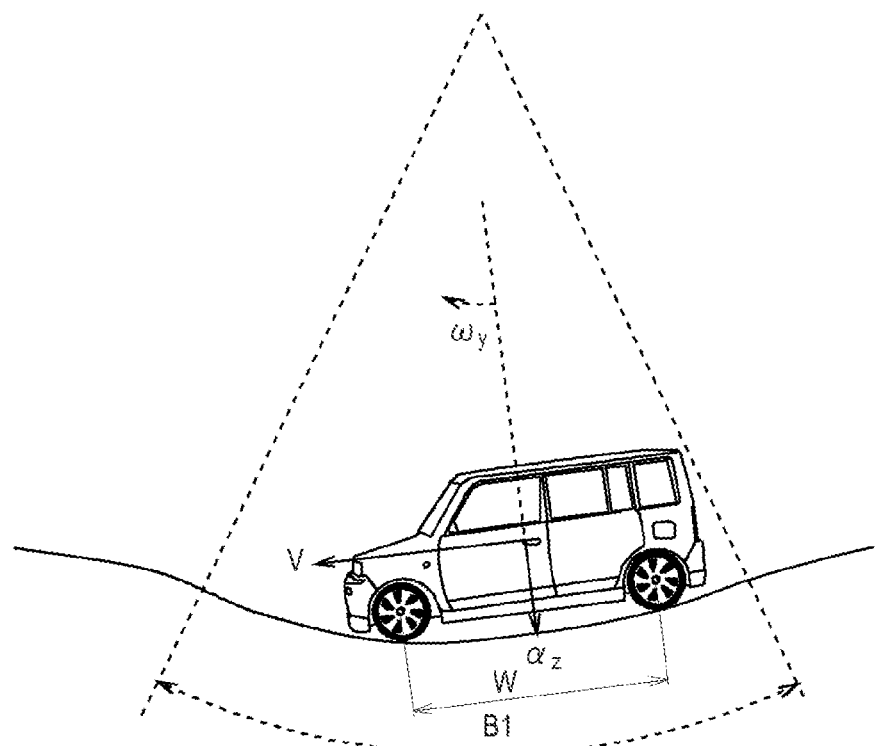
FIG. 24A and FIG. 24B are diagrams schematically showing states of an acceleration and a pitch rate in different arc lengths.

Meanwhile, as is shown in FIG. 24A, in a case where an arc B1 of undulation of the road surface is larger than the wheel base W of the vehicle, the PND 1 is able to calculate the velocity V precisely using the fundamental principle described above.

Figure 24B:
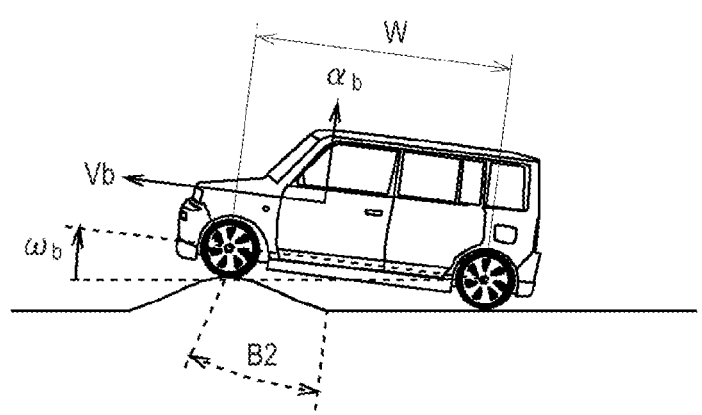

However, as is shown in FIG. 24B, for example, in a case where an arc B2 of undulation of the road surface is smaller than the wheel base W, when the front wheels of the vehicle climb over the undulation, an acceleration $\alpha_b$ in the vertical direction with respect to the vehicle and an angular velocity $\omega_b$ about the Y axis centered on the rear wheels of the vehicle are generated.

In this instance, the PND 1 detects the acceleration $\alpha_b$ and the angular velocity $\omega_b$ (FIG. 24B) using the triaxial acceleration sensor 4 and the Y axis gyro sensor 5, respectively, without detecting the acceleration $\alpha_z$ and the pitch rate $\omega_y$ (FIG. 24A) generated by an oscillation at 1 to 2 [Hz] corresponding to undulation of the road surface.

The acceleration $\alpha_b$ takes a larger value than the acceleration $\alpha_z$ generated when the arc B1 of undulation of the road surface is larger than the wheel base W. Also, the angular velocity $\omega_b$ takes a larger value than the pitch rate $\omega_y$ generated when the arc B1 of undulation of the road surface is larger than the wheel base W of the vehicle.

Further, a velocity (hereinafter, referred to as the small arc velocity) $V_b$ calculated in accordance with Equation (1) or Equation (3) above on the basis of the acceleration $\alpha_b$ and the angular velocity $\omega_b$ generated when the arc B2 of undulation of the road surface is smaller than the wheel base W takes an extremely larger value than the velocity V calculated in accordance with Equation (1) or Equation (3) on the basis of the acceleration $\alpha_z$ and the pitch rate $\omega_y$ generated when the arc B1 of undulation of the road surface is larger than the wheel base W of the vehicle because the acceleration $α_b$ varies larger than the angular velocity $ω_b$.

Accordingly, in a case where the arc B2 of undulation of the road surface is smaller than the wheel base W of the vehicle, the velocity calculation portion 22 in the PND 1 consequently calculates the velocity V as an excessively large value by calculating the small arc velocity $V_b$ using the acceleration $α_b$ and the angular velocity $ω_b$.

In order to avoid such an inconvenience, the smoothing and noise removal portion 35 acquires the acceleration data AD2 and the pitch rate data PD2 to which the low-pass filter processing has been applied from the low-pass filter portion 33 and determines whether the acceleration $α_z$ corresponding to the acceleration data AD2 and the pitch rate $ω_y$ corresponding to the pitch rate data PD2 are larger than corresponding predetermined threshold values.

In a case where the acceleration $α_z$ corresponding to the acceleration data AD2 and the pitch rate $ω_y$ corresponding to the pitch rate data PD2 are larger than the corresponding predetermined threshold values, the smoothing and noise removal portion 35 determines that the velocity V is excessively high, and does not use the velocity V to which the low-pass filter processing has been applied but uses the previous value velocity $V_{n-1}$. In other words, the smoothing and noise removal portion 35 is configured to use the previous value speed $V_{n-1}$ when the velocity V takes an excessively large value at velocities other than an extremely low velocity because it is highly likely that the velocity V is wrong.

As has been described, the smoothing and noise removal portion 35 is able to calculate the velocity V more precisely by setting the velocity V to 0 at an extremely low velocity in a case where the velocity V to which the low-pass filter processing has been applied takes an excessively large value and by using the previous value velocity $V_{n-1}$ as the velocity V otherwise.

(4) Position Calculation Processing Procedure Using Velocity Calculation Processing The position calculation processing procedure by the control portion 11 in the PND 1 to calculate a current position using the velocity calculation processing described above will now be described using the flowchart of FIG. 25.

In practice, the control portion 11 begins the procedure in the start step of Routine RT1 and proceeds to Step SP1 where it acquires the acceleration data AD detected by the triaxial acceleration sensor 4 and the pitch rate data PD detected by the Y axis gyro sensor 5 using the data acquisition portion 31 of the velocity calculation portion 22, after which it proceeds to following Step SP2.

In Step SP2, the control portion 11 applies the high-pass filter processing to the acceleration data AD and the pitch rate data PD using the high-pass filter portion 32 of the velocity calculation portion 22, and proceeds to following Step SP3.

In Step SP3, the control portion 11 applies the low-pass filter processing using a biquadratic IIR filter at the cutoff frequency, for example, of 1 [Hz] to the acceleration data AD1 and the pitch rate data PD1 to which the high-pass filter processing has been applied, using the low-pass filter portion 33 of the velocity calculation portion 22, and proceeds to following Step SP4.

In Step SP4, the control portion 11 calculates the velocity V in accordance with Equation (3) above on the basis of the acceleration $α_z$ corresponding to the acceleration data AD2 and the pitch rate $ω_y$ corresponding to the pitch rate data PD2 to which the low-pass filter processing has been applied, using the velocity computation portion 34 of the velocity calculation portion 22, and proceeds to following Step SP5.

In Step SP5, the control portion 11 applies the smoothing and noise removal processing to the velocity data VD indicating the velocity V calculated in Step SP4.

To be more concrete, the control portion 11 applies the low-pass filter processing at a variable cutoff frequency to the velocity data VD1 indicating the velocity V calculated in Step SP4.

In a case where the control portion 11 determines that the velocity V to which the low-pass filter processing has been applied is an excessively large value, it sets the velocity V to 0 at an extremely low velocity, for example, lower than 10 [km] per hour and uses the previous value velocity $V_{n-1}$ as the velocity V otherwise, and proceeds to following Step SP6.

In Step SP6, the control portion 11 acquires the yaw data YD detected by the Z axis gyro sensor 6 using the angle calculation portion 23, and proceeds to following Step SP7.

In Step SP7, the control portion 11 calculates angle data DD indicating the angle θ by multiplying the yaw rate $ω_z$ corresponding to the yaw rate data YD by 0.02 [s], which is a sampling cycle, using the angle calculation portion 23, and proceeds to following Step SP8.

In Step SP8, the control portion 11 calculates the current position data NPD2 on the basis of the velocity data VD to which the smoothing and noise removal processing has been applied in Step SP5 and the angle data DD calculated in Step SP8, and proceeds to following Step SP9.

In Step SP9, the control portion 11 reads out from the memory portion 12 the map data of the periphery including the current position of the vehicle on the basis of the current position data NPD2 supplied from the position calculation portion 25 so as to create a map image including the current position and outputs the map image to the display portion 2, after which it proceeds to following Step SP10 to end the processing.

(5) Measurement Results

Figure 36:
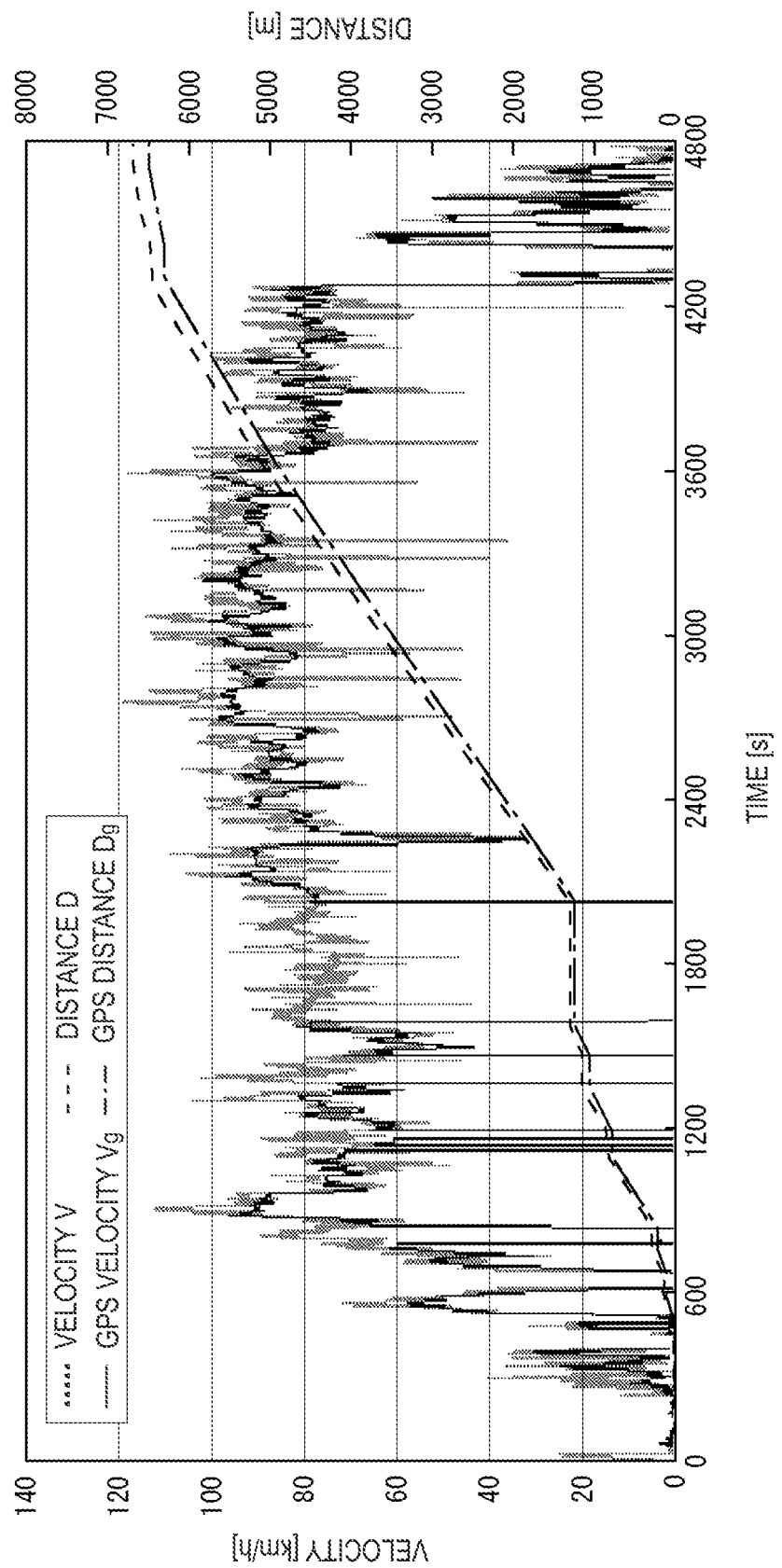
FIG. 36 is a diagram schematically showing a comparison of the measurement result by the PND mounted on a compact vehicle and the velocity and the distance based on the GPS signals.
Figure 37:
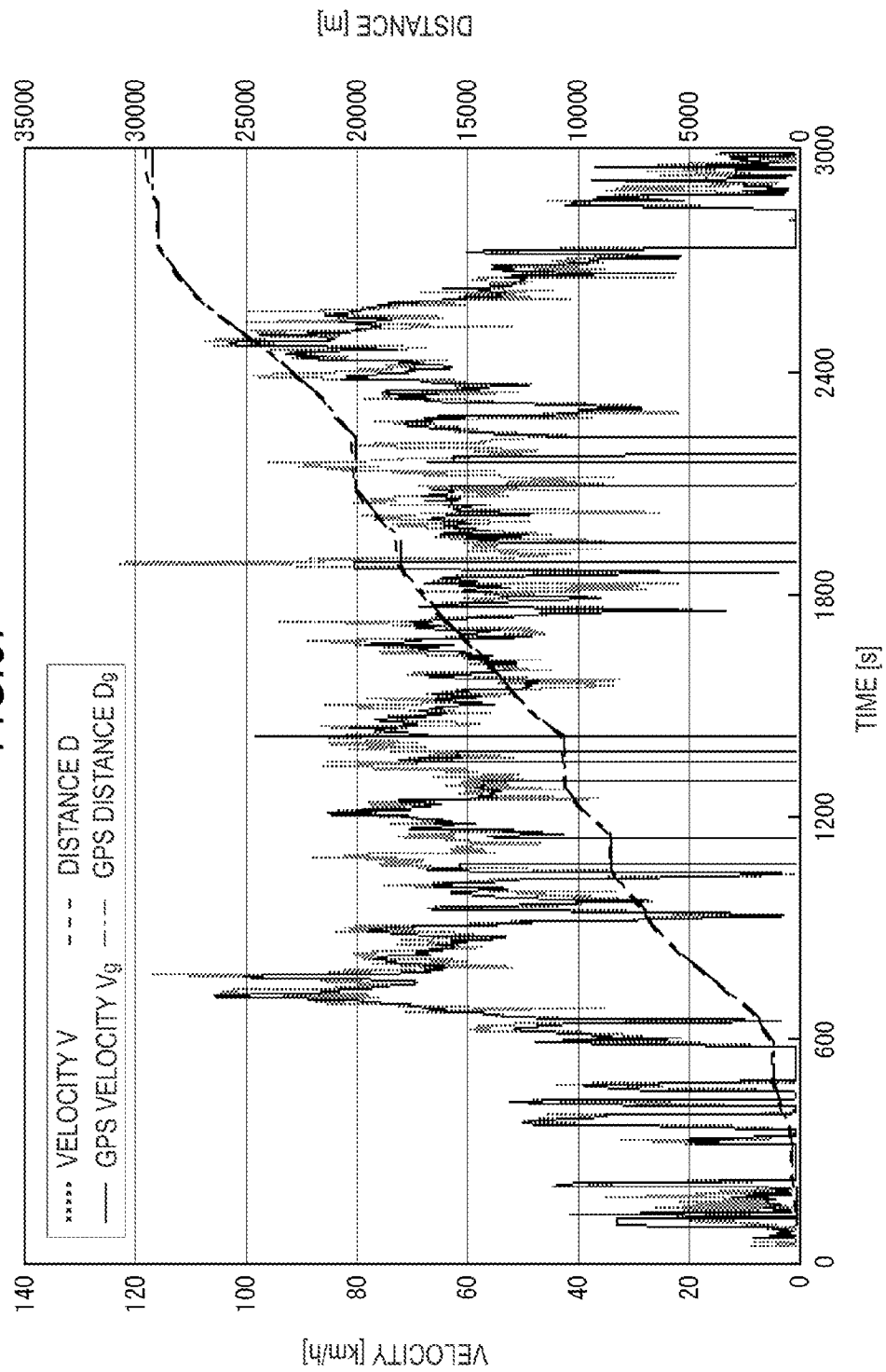
FIG. 37 is a diagram schematically showing a comparison of the measurement result by the PND mounted on a minivan vehicle and the velocity and the distance based on the GPS signals.

Measurement results calculated by the velocity calculation processing described above are shown in FIG. 26A through FIG. 37. FIG. 26A through FIG. 35B show the measurement results by the PND 1 mounted on a sedan vehicle. FIG. 36 and FIG. 37 show the measurement results by the PND 1 mounted on a compact vehicle and a minivan vehicle, respectively.

FIG. 26A shows the acceleration $α_z$ and the pitch rate $ω_y$ respectively corresponding to the acceleration data AD and the pitch rate date PD detected by the triaxial acceleration sensor 4 and the Y axis gyro sensor 5, respectively. FIG. 26B shows the velocity V calculated in accordance with Equation (3) above using the acceleration $α_z$ and the pitch rate $ω_y$.

As is obvious from FIG. 26A and FIG. 26B, in the PND 1, the acceleration $α_z$ increases with an increase of the velocity V of the vehicle whereas the pitch rate $ω_y$ takes a substantially constant value.

FIG. 27A through FIG. 31B show graphs of the velocity V calculated by performing the velocity calculation processing and a distance D calculated using the velocity V by the PND 1 and graphs of a velocity $V_{ref}$ calculated from a vehicle velocity pulse of the vehicle on which the PND 1 is mounted and a distance $D_{ref}$ calculated using the velocity $V_{ref}$ for comparison with the velocity V and the distance D.

FIG. 27A through FIG. 31B show graphs when the vehicle on which is mounted the PND 1 travels on different roads.

Herein, the velocity calculated from the vehicle velocity pulse of the vehicle is referred to also as the reference velocity and the distance calculated using the reference velocity is referred to also as the reference distance.

Figure 27A:
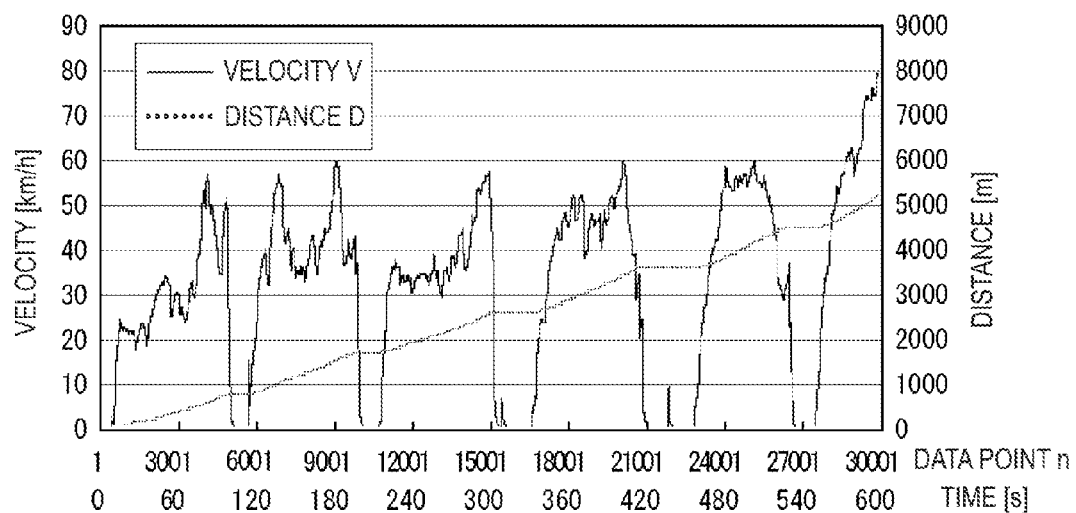
FIG. 27A and FIG. 27B are diagrams schematically showing a comparison (1) of the measurement result with the reference.
Figure 27B:
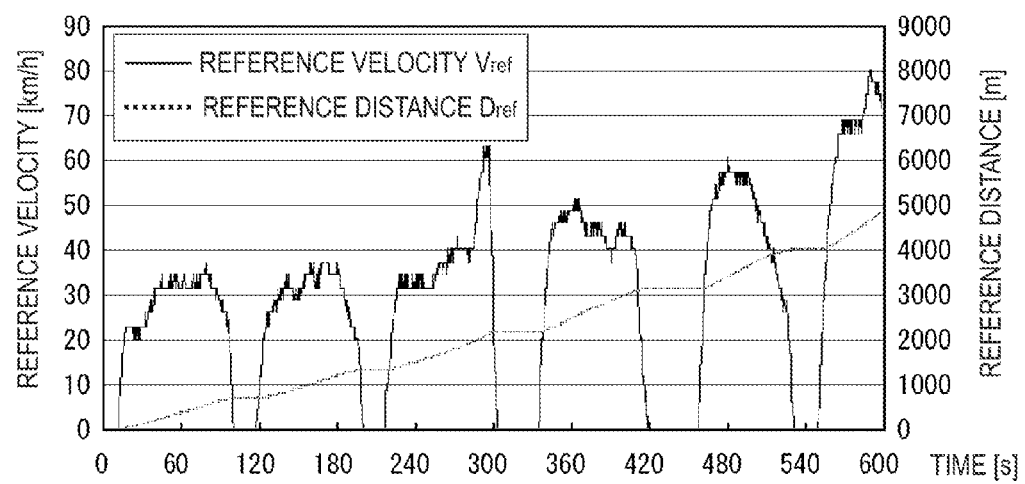

FIG. 27A shows the velocity V calculated using the velocity calculation processing according to an embodiment of the present invention and the distance D calculated using the velocity V. FIG. 27B shows the reference velocity $V_{ref}$ and the reference distance $D_{ref}$ for comparison with the velocity V and the distance D shown in FIG. 27A.

As are shown in FIG. 27A and FIG. 27B, the velocity V has a substantially similarity relation with the reference velocity $V_{ref}$ and the distance D calculated on the basis of the velocity V generates only a slight error of less than 10% with respect to the reference distance $D_{ref}$.

Figure 28A:
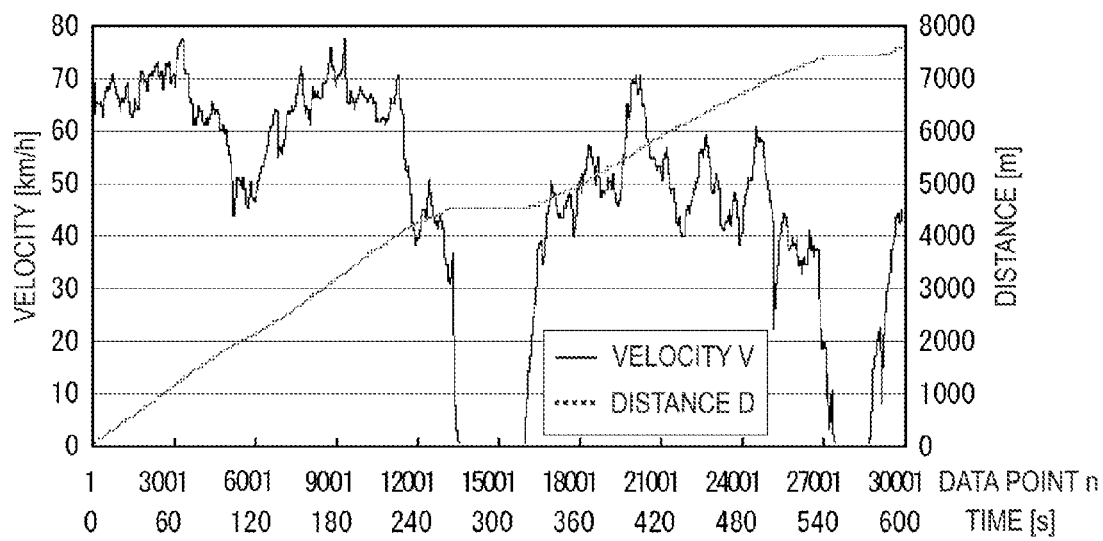
FIG. 28A and FIG. 28B are diagrams schematically showing a comparison (2) of the measurement result with the reference.
Figure 28B:
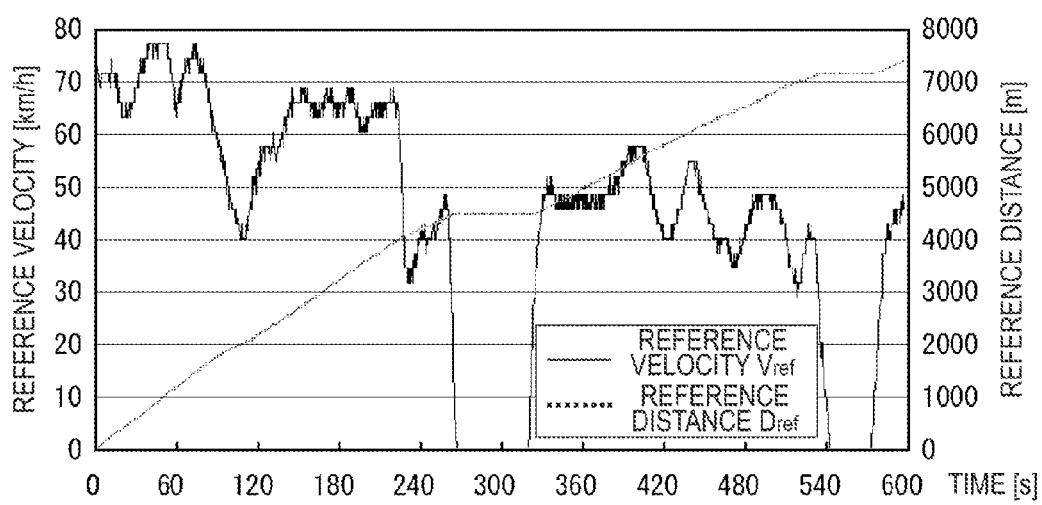

FIG. 28A shows the velocity V calculated using the velocity calculation processing according to an embodiment of the present invention and the distance D calculated using the velocity V. FIG. 28B shows the reference velocity $V_{ref}$ and the reference distance $D_{ref}$ for comparison with the velocity V and the distance D shown in FIG. 28A.

Figure 29A:
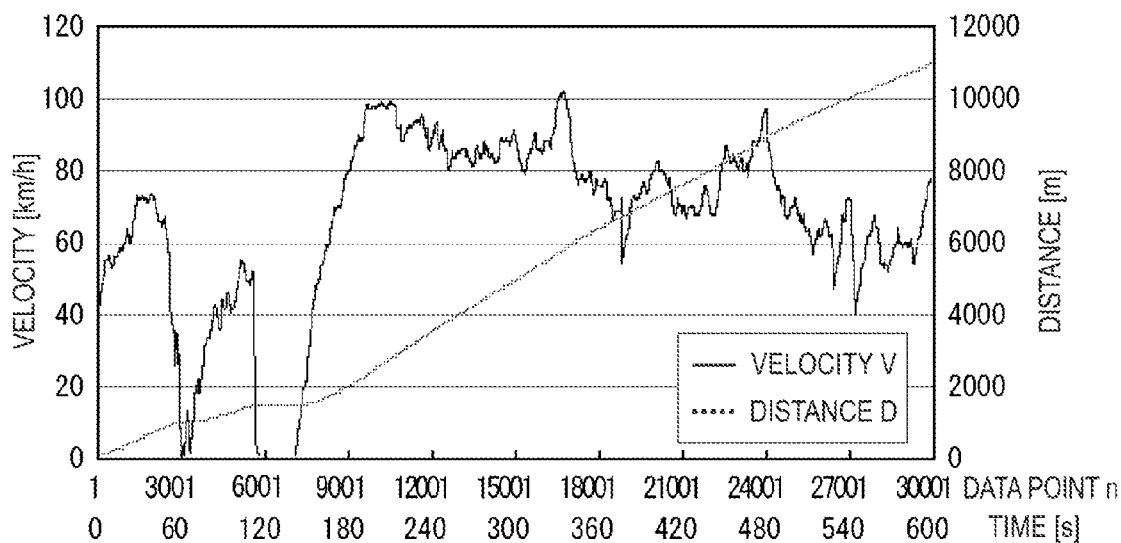
FIGS. 29A and 29B are diagrams schematically showing a comparison (3) of the measurement result with the reference.
Figure 29B:
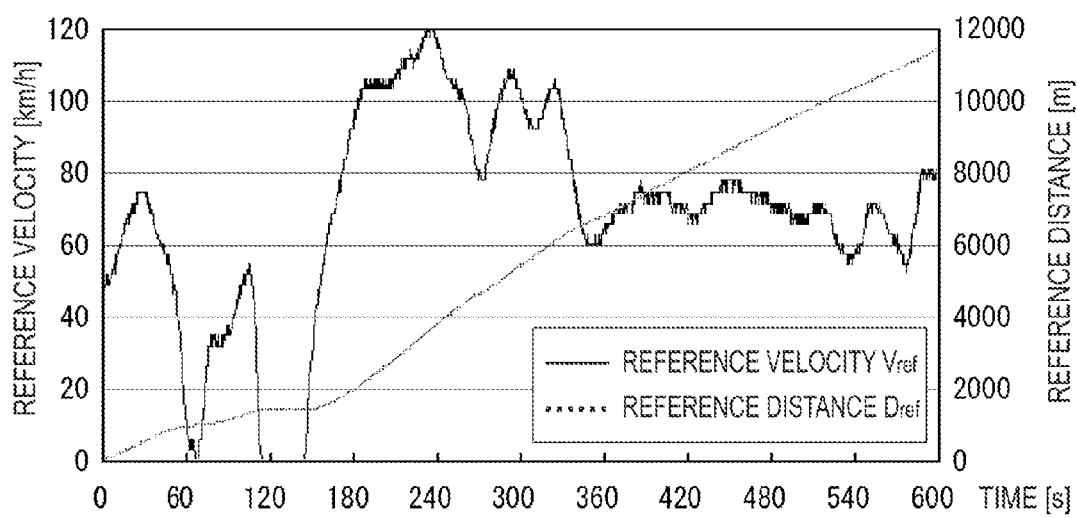

Further, FIG. 29A shows the velocity V calculated using the velocity calculation processing according to an embodiment of the present invention and the distance D calculated using the velocity V. FIG. 29B shows the reference velocity $V_{ref}$ and the reference distance $D_{ref}$ for comparison with the velocity V and the distance D shown in FIG. 29A.

Figure 30A:
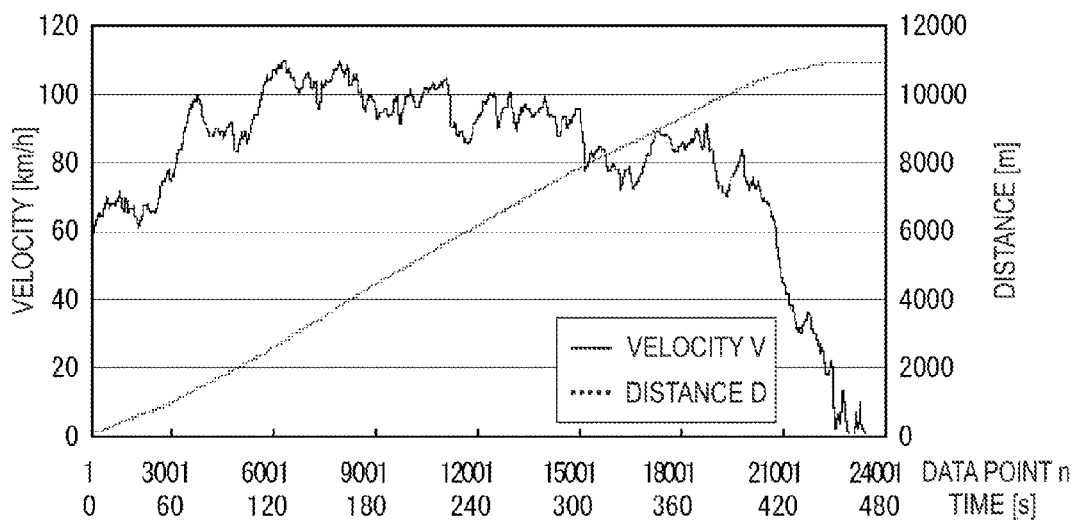
FIGS. 30A and 30B are diagrams schematically showing a comparison (4) of the measurement result with the reference.
Figure 30B:
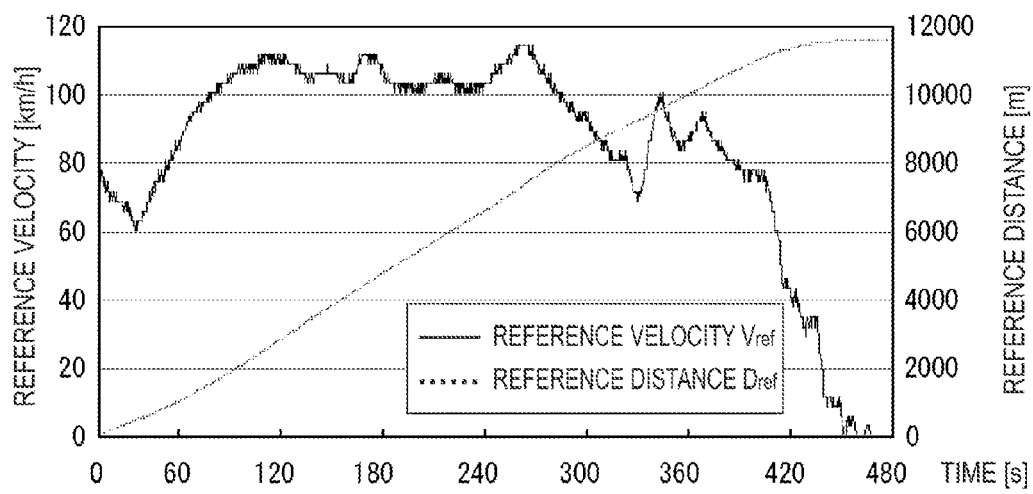

Further, FIG. 30A shows the velocity V calculated using the velocity calculation processing according to an embodiment of the present invention and the distance D calculated using the velocity V. FIG. 30B shows the reference velocity $V_{ref}$ and the reference distance $D_{ref}$ for comparison with the velocity V and the distance D shown in FIG. 30A.

Figure 31A:
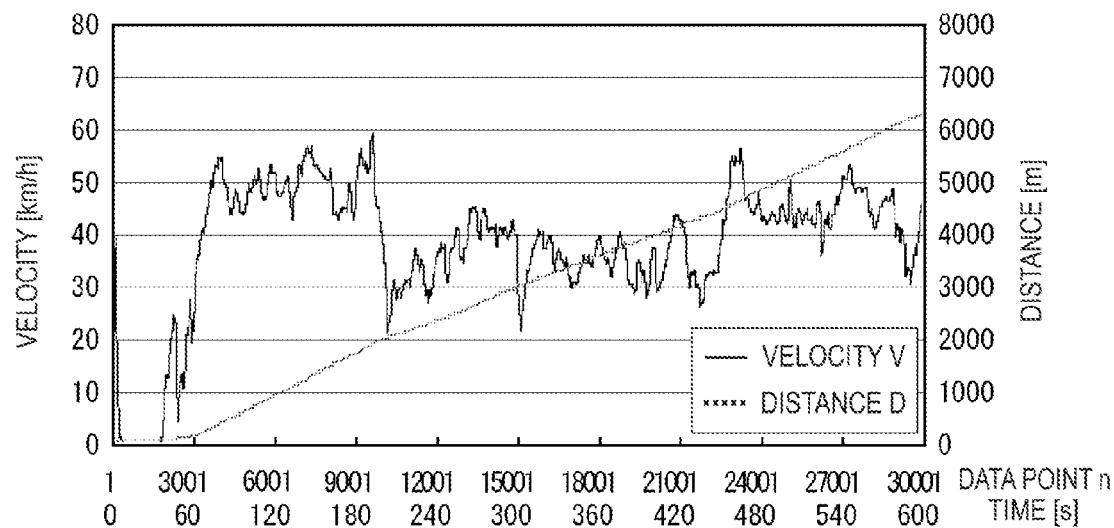
FIGS. 31A and 31B are diagrams schematically showing a comparison (5) of the measurement result with the reference.
Figure 31B:
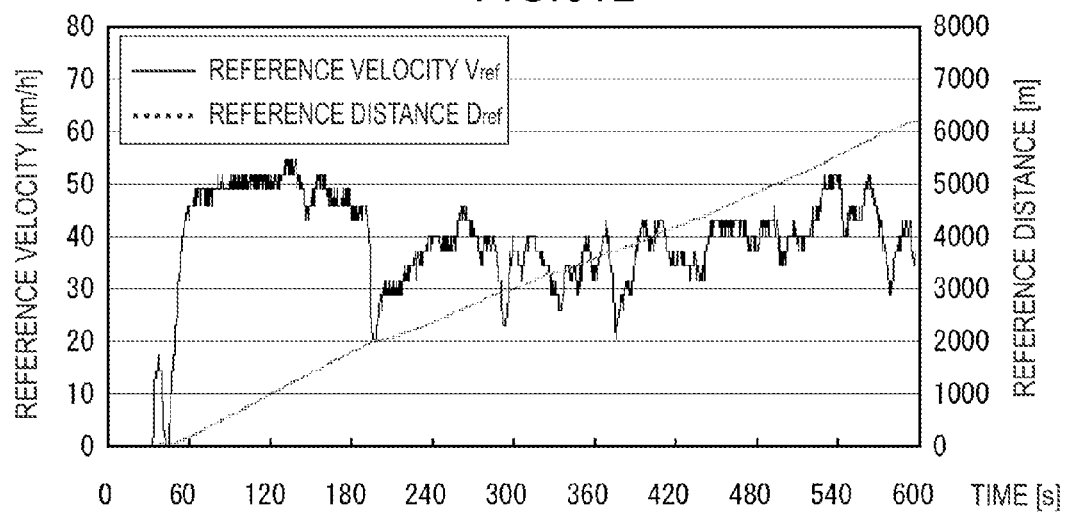

Further, FIG. 31A shows the velocity V calculated using the velocity calculation processing according to an embodiment of the present invention and the distance D calculated using the velocity V. FIG. 31B shows the reference velocity $V_{ref}$ and the reference distance $D_{ref}$ for comparison with the velocity V and the distance D shown in FIG. 31A.

As with the velocity V shown in FIG. 26A, the velocities V shown in FIG. 27A, FIG. 28A, FIG. 29A, FIG. 30A, and FIG. 31A have a substantially similarity relation with the reference velocities $V_{ref}$ shown in FIG. 27B, FIG. 28B, FIG. 29B, FIG. 30B, and FIG. 31B, respectively, and the distances D calculated on the basis of the velocities V generate only a slight error of less than 10% with respect to the reference distances $D_{ref}$.

Figure 32A:
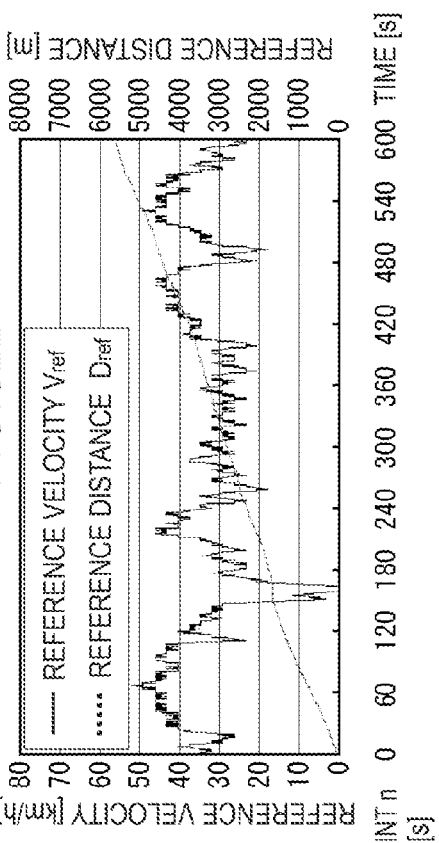
FIG. 32A through FIG. 32C are diagrams schematically showing a comparison (1) of the measurement result with the reference at a curve.
Figure 32B:
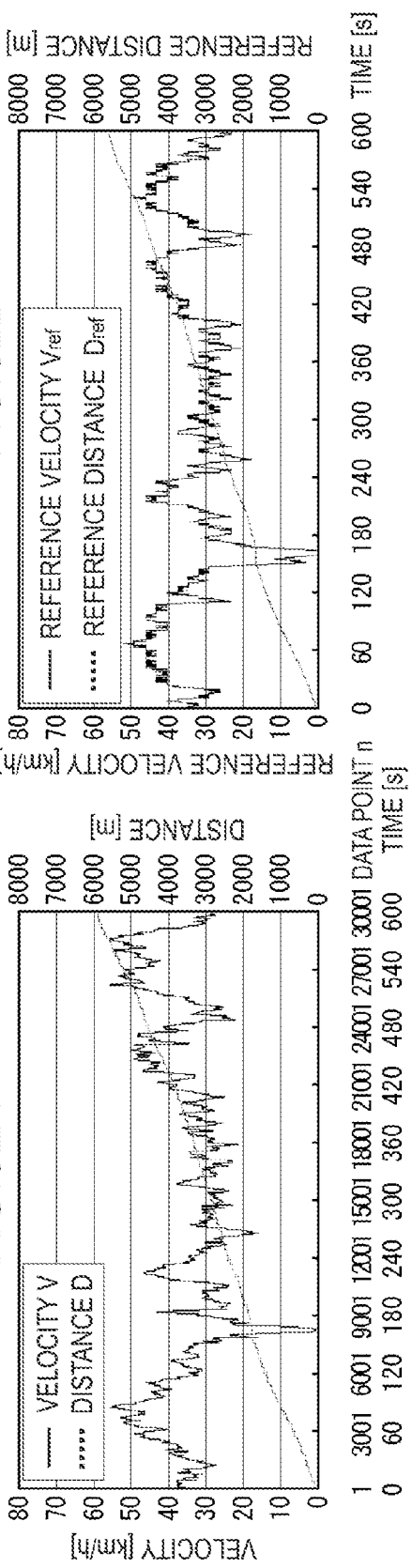

FIG. 32A shows the graph of the velocity V calculated by the PND 1 using the velocity calculation processing and the distance D and FIG. 32B shows the graph of the reference velocity $V_{ref}$ and the reference distance $D_{ref}$ calculated from the reference $V_{ref}$. Further, FIG. 32C shows the graph of the yaw rate $\omega_z$ detected by the Z axis gyro sensor 6 in the PND 1.

The yaw rate $\omega_z$ shown in FIG. 32C indicates that the vehicle takes a right turn when the value thereof exceeds about 20 [deg/s] and the vehicle takes a left turn when the value thereof drops below about −20 [deg/s].

Figure 32C:
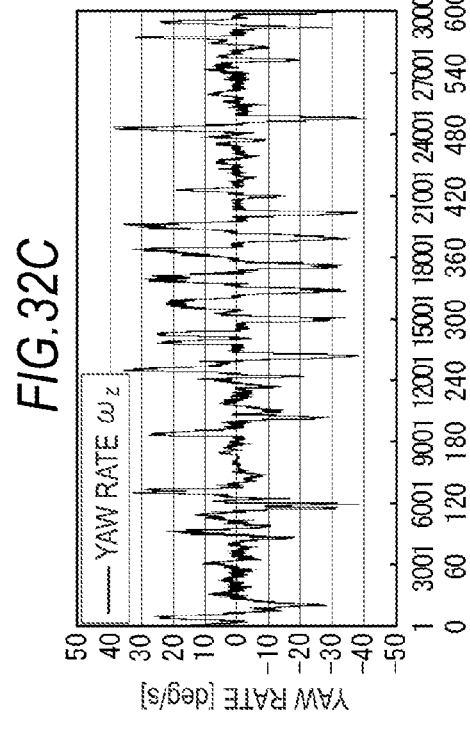

Hence, as is shown in FIG. 32C, even in a case where the vehicle repetitively takes a right turn and a left turn several times in succession, the velocity V (FIG. 32A) calculated by the PND 1 has a substantially similarity relation with the reference velocity $V_{ref}$ (FIG. 32B) and the distance D calculated on the basis of the velocity V generates only a slight error of less than 10% with respect to the reference distance $D_{ref}$.

FIG. 33A shows the graph of the velocity V calculated by the PND 1 using the velocity calculation processing and the distance D when the vehicle travels a road different from the road in the case of FIG. 32A. FIG. 33B shows the graph of the reference velocity $V_{ref}$ and the reference distance $D_{ref}$ calculated from the reference velocity $V_{ref}$. Further, FIG. 33C shows the graph of the yaw rate $\omega_z$ detected by the Z axis gyro sensor 6.

Figure 34A:
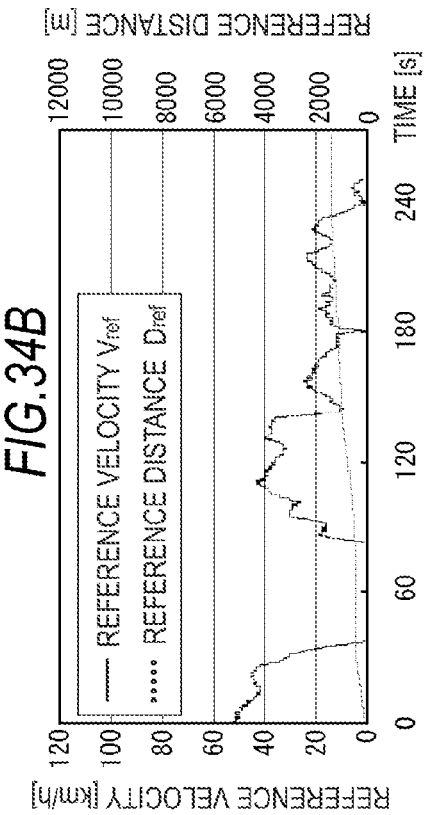
FIG. 34A through FIG. 34C are diagrams schematically showing a comparison (3) of the measurement result with the reference at a curve.
Figure 34B:
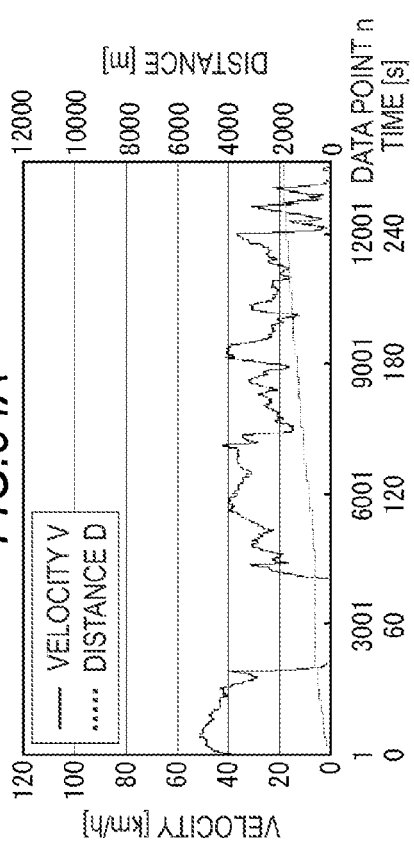
Figure 34C:
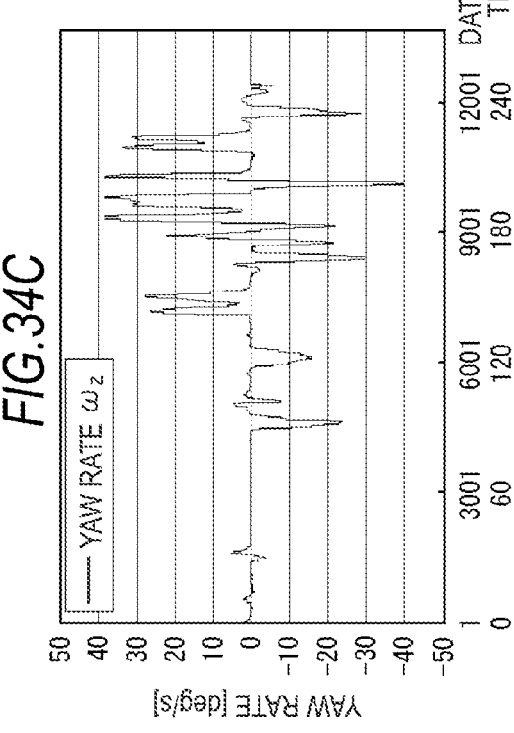

Further, FIG. 34A shows the graph of the velocity V calculated by the PND 1 using the velocity calculation processing and the distance D in a case where the vehicle travels on a road different from the roads in the cases of FIGS. 32A and 33A. FIG. 34B shows the graph of the reference velocity $V_{ref}$ and the reference distance $D_{ref}$ calculated from the reference velocity $V_{ref}$. Further, FIG. 34C shows the graph of the yaw rate $\omega_z$ detected by the Z axis gyro sensor 6.

It is also understood from these results that even when the vehicle travels along many curves, the velocity V calculated by the PND 1 has a substantially similarity relation with the reference velocity $V_{ref}$ and the distance D calculated on the basis of the velocity V generates only a slight error of less than 10% with respect to the reference distance $D_{ref}$.

FIG. 35B shows a travel track T plotting the current position calculated by the PND 1 mounted on the vehicle when the vehicle travels from the start S to the goal G along the path K on the map shown in FIG. 35A.

The travel track T (FIG. 35B) has substantially the same size as and a similarity relation with the path K (FIG. 35A) the vehicle has traveled. It is therefore understood that the PND 1 is able to calculate the current position substantially precisely.

FIG. 36 shows the velocity V and the distance D calculated by the PND 1 mounted on a compact vehicle superimposed on a velocity $V_g$ calculated on the basis of GPS signals received via the GPS antenna ANT and a distance $D_g$ calculated from the velocity $V_g$ for comparison with the velocity V and the distance D.

Hereinafter, the velocity calculated on the basis of the GPS signals received via the GPS antenna ANT is referred to also as the GPS velocity and the distance calculated from the GPS velocity is referred to also as the GPS distance.

FIG. 37 shows the velocity V and the distance D calculated by the PND 1 mounted on a minivan vehicle superimposed on the GPS velocity $V_g$ calculated on the basis of the GPS signals and the GPS distance $D_g$ calculated from the GPS velocity $V_g$ for comparison with the velocity V and the distance D.

As are shown in FIG. 36 and FIG. 37, the velocity V calculated by the PND 1 according to an embodiment of the present invention in a plurality of vehicles each having a different vehicle size, that is, a different wheel base, has a substantially similarity relation with the GPS velocity $V_g$ and the distance D calculated on the basis of the velocity V generates only a slight error of less than 10% with respect to the GPS distance $D_g$.

Incidentally, in FIG. 36 and FIG. 37, in a case where the PND 1 fails to receive the GPS signals, for example, in a case where the vehicle goes into a tunnel, the GPS velocity $V_g$ is calculated as being 0.

(6) Operation and Advantage

With the configuration described above, the PND 1 detects the acceleration $\alpha_z$ in the Z axis direction perpendicular to the travel direction of the vehicle generated by undulation of the road surface using the triaxial acceleration sensor 4 and detects the pitch rate $\omega_y$ about the Y axis orthogonal to the travel direction generated by undulation of the road surface using the Y axis gyro sensor 5.

The PND 1 is configured to calculate the velocity V in accordance with Equation (1) or Equation (3) above on the basis of the acceleration $\alpha_z$ detected by the triaxial velocity sensor 4 and the pitch rate $\omega_y$ detected by the Y axis gyro sensor 5.

Hence, even when the PND 1 fails to receive GPS signals, it is able to calculate the velocity V of the vehicle precisely in all the road environments by the simple configuration using the triaxial acceleration sensor 4 and the Y axis gyro sensor 5 alone.

In addition, with the PND 1 of the configuration attachable to and detachable from the vehicle, it is not necessary for the user to perform a tedious operation to connect a cable used to transfer a vehicle velocity pulse signal from the vehicle. The PND 1 therefore becomes more convenient.

Also, the PND 1 is configured to detect the yaw rate $\omega_z$ about the Z axis perpendicular to the travel direction of the vehicle using the Z axis gyro sensor 6 and to calculate the current position on the basis of the velocity V and the yaw rate $\omega_z$.

Accordingly, even when the PND 1 fails to receive GPS signals, it is able to calculate the current position of the vehicle precisely in all the road environments by the simple configuration to provide the triaxial acceleration sensor 4, the Y axis gyro sensor 5, and the Z axis gyro sensor 6 alone.

Further, the PND 1 is configured to apply the low-pass filter processing to the acceleration data AD1 and the pitch rate data PD1 when calculating the velocity V. Hence, the PND 1 is able to remove the components of the acceleration $\alpha_c$ and the angular velocity $\omega_c$ oscillating, for example, at about 15 [Hz] generated by the cradle 3 and made of a frequency sufficiently large for the acceleration $\alpha_z$ and the pitch rate $\omega_y$ oscillating at 1 to 2 [Hz] generated by undulation of the road surface.

Consequently, the PND 1 is able to calculate the velocity V further precisely using the acceleration $\alpha_z$ and the pitch rate $\omega_y$ from which the oscillation components generated by the cradle 3 have been removed.

Also, the PND 1 extracts the maximum acceleration $\alpha_{z,max}$ and the minimum acceleration $\alpha_{z,min}$ from a range of 25 data points or 75 data points about the data point Pm of the acceleration $\alpha_z$, and extracts the maximum pitch rate $\omega_{y,max}$ and the minimum pitch rate $\omega_{y,min}$ from a range of 25 data points or 75 data points about the data point Pm of the pitch rate $\omega$.

The PND 1 then calculates the velocity V in accordance with Equation (3) above using the maximum acceleration $\alpha_{z,max}$ and the minimum acceleration $\alpha_{z,min}$ and the maximum pitch rate $\omega_{y,max}$ and the minimum pitch rate $\omega_{y,min}$.

Consequently, by using data points in a range wider than the phase lag between the acceleration $\alpha_z$ and the pitch rate $\omega_y$ that varies with the mount position of the PND 1 inside the vehicle, the PND 1 becomes able to remove the influence of a phase lag between the acceleration $\alpha_z$ and the pitch rate $\omega_y$ described above.

Also, in a case where the velocity V calculated in accordance with Equation (3) above on the basis of the acceleration $\alpha_z$ and the pitch rate $\omega_y$ is an excessively large value, the PND 1 is able to calculate the velocity V more precisely by setting the velocity V to 0 at an extremely low velocity and using the previous value velocity $V_{n-1}$ as the velocity V otherwise.

According to the configuration described above, by detecting the acceleration $\alpha_z$ in the Z axis direction generated by undulation of the road surface and the pitch rate $\omega_y$ about the Y axis generated by undulation of the road surface and by calculating the velocity V using the acceleration $\alpha_z$ and the pitch rate $\omega_y$, it becomes possible to calculate the velocity V precisely in all the road environments.

(7) Other Embodiments

In the embodiment of the present invention described above, when the velocity V is calculated, the velocity V is calculated in accordance with Equation (3) above on the basis of the maximum acceleration $\alpha_{z,max}$ and the minimum acceleration $\alpha_{z,min}$ extracted from the acceleration $\alpha_z$ corresponding to the acceleration data AD2 and the maximum pitch rate $\omega_{y,max}$ and the minimum pitch rate $\omega_{y,min}$ extracted from the pitch rate $\omega_y$ corresponding to the angular velocity DD2.

It should be appreciated, however, that the present invention is not limited to the embodiment described above. The velocity computation portion 34 may be configured in such a manner that it finds, for example, variances of 25 data points or 75 data points about the data point Pm corresponding to the last position P0 of the acceleration $\alpha_z$ corresponding to the acceleration data AD2 and the pitch rate $\omega_y$ corresponding to the pitch rate data PD2 supplied from the low-pass filter portion 33, so that the velocity computation portion 34 calculates the velocity V by dividing the variance of the acceleration $\alpha_z$ by the variance of the pitch rate $\omega_y$.

Alternatively, the velocity computation portion 34 may find, for example, deviations in a range of 25 data points or 75 data points about the data point Pm corresponding to the last position P0 of the acceleration $\alpha_z$ corresponding to the acceleration data AD2 and the pitch rate $\omega_y$ corresponding to the pitch rate data PD2 supplied from the low-pass filter portion 33, so that the velocity computation portion 34 calculates the velocity V by dividing the deviation of the acceleration $\alpha_z$ by the deviation of the pitch rate $\omega_y$.

Also, the embodiment of the present invention above has described a case where the accelerations $\alpha_x$, $\alpha_y$, $\alpha_z$ and the pitch rate $\omega_y$ and the yaw rate $\omega_z$ are measured by the triaxial acceleration sensor 4, the Y axis gyro sensor 5, and the Z axis gyro sensor 6, respectively, at the sampling frequency of 50 [Hz]. It should be appreciated, however, that the present invention is not limited to the embodiment described above. The triaxial acceleration sensor 4, the Y axis gyro sensor 5, and the Z axis gyro sensor 6 may be configured in such a manner so as to detect the accelerations $\alpha_x$, $\alpha_y$, $\alpha_z$, the angular velocity $\omega_y$, and the angular velocity $\omega_z$, respectively, at a predetermined sampling frequency of other than 50 [Hz], for example, 10 [Hz].

Further, the embodiment of the present invention above has described a case where the velocity V is calculated using the acceleration $\alpha_z$ and the pitch rate $\omega_y$ detected at the sampling frequency of 50 [Hz]. It should be appreciated, however, that the present invention is not limited to the embodiment described above. The velocity calculation portion 22 in the PND 1 may be configured in such a manner that it finds average values of the acceleration $\alpha_z$ and the pitch rate $\omega_y$ detected at the sampling frequency of 50 [Hz] in every 25 data points and calculates the velocity V using the average values of the acceleration $\alpha_z$ and the pitch rate $\omega_y$.

In this case, by finding the average values of the acceleration $\alpha_z$ and the pitch rate $\omega_y$ detected at the sampling frequency of 50 [Hz], for example, in every 25 data points, the velocity calculation portion 22 in the PND 1 consequently calculates the velocity V only two times per second. The control portion 11 in the PND 1 therefore reduces the processing load for the velocity calculation processing.

Further, the embodiment of the present invention above has described a case where the high-pass filter processing is applied by the high-pass filter portion 32 to the acceleration data AD and the pitch rate data PD detected by the triaxial acceleration sensor 4 and the Y axis gyro sensor 5, respectively. It should be appreciated, however, that the present invention is not limited to the embodiment described above. The PND 1 may be configured in such a manner that the high-pass filter processing is not applied to the acceleration data AD and the pitch rate data PD detected by the triaxial acceleration sensor 4 and the Y axis gyro sensor 5, respectively.

Further, the embodiment of the present invention above has described a case where the high-pass filter processing and the low-pass filter processing are applied by the high-pass filter portion 32 and the low-pass filter portion 33, respectively, to the acceleration data AD and the pitch rate data PD detected by the triaxial acceleration sensor 4 and the Y axis gyro sensor 5, respectively. It should be appreciated, however, that the present invention is not limited to the embodiment described above. The PND 1 may be configured in such a manner that moving average filter processing is applied to the acceleration data AD and the pitch rate data PD in addition to the high-pass filter processing and the low-pass filter processing. Alternatively, the PND 1 may be configured in such a manner that the high-pass filter processing, the low-pass filter processing, and the moving average filter processing combined in an arbitrary manner are applied to the acceleration data AD and the pitch rate data PD.

Further, the embodiment of the present invention above has described a case where the velocity V, for example, at the last position P0 is calculated using the acceleration $\alpha_z$ and the pitch rate $\omega_y$, when it is determined that the velocity V at the last position P0 is excessively high, the previous value velocity $V_{n-1}$ is used as the velocity V at the last position P0. It should be appreciated, however, that the present invention is not limited to the embodiment described above. The velocity calculation portion 22 in the PND 1 may be configured in such a manner that in a case where the velocity V at the last position P0 is higher than the previous value velocity $V_{n-1}$ by a predetermined threshold value or more, it finds a value obtained by adding a value comparable to a velocity that the vehicle is presumably able to accelerate to the previous value velocity $V_{n-1}$ and uses the value thus found as the velocity V at the last position P0.

Alternatively, the velocity calculation portion 22 in the PND 1 may be configured in such a manner that in a case where the velocity V at the last position P0 is lower than the previous value velocity $V_{n-1}$ by a predetermined threshold or more, it finds a value obtained by subtracting a value comparable to a velocity that the vehicle is presumably able to decelerate from the previous value velocity $V_{n-1}$ and uses the value thus found as the velocity V at the last position P0.

Further, the embodiment of the present invention above has described a case where the velocity V is calculated in accordance with Equation (3) above on the basis of the acceleration $\alpha_z$ and the pitch rate $\omega_y$.

It should be appreciated, however, that the present invention is not limited to the embodiment described above. The control portion 11 in the PND 1 may be configured in such a manner that it compares the velocity V calculated in accordance with Equation (3) above on the basis of the acceleration $\alpha_z$ and the pitch rate $\omega_y$ with the GPS velocity $V_g$ calculated on the basis of the GPS signals.

In a case where there is an error between the velocity V and the GPS velocity $V_g$, the control portion 11 in the PND 1 calculates a correction coefficient used to correct the error with the velocity V, for example, so as to minimize the error using a linear function or a high-order function, such as a quadratic or higher function, and stores the correction coefficient in the memory portion 12.

Hence, the velocity calculation portion 22 in the PND 1 calculates the velocity V in accordance with Equation (3) above on the basis of the acceleration $\alpha_z$ and the pitch rate $\omega_y$ detected by the triaxial acceleration sensor 4 and the Y axis gyro sensor 5, respectively, after which it reads out the correction coefficient from the memory portion 12 so as to correct the velocity V by a linear function or a high-order function, such as a quadratic or higher function, using the correction coefficient.

As has been described, by preliminarily learning the correction coefficient of the velocity V on the basis of the GPS velocity $V_g$ calculated on the basis of GPS signals, the PND 1 becomes able to enhance the calculation accuracy of the velocity V.

When calculating the correction coefficient of the velocity V and the GPS velocity $V_g$, the control portion 11 in the PND 1 may divide the velocity V to a plurality of velocity regions, such as an extremely low velocity, a low velocity, a medium velocity, and a high velocity, so that it calculates a correction coefficient for each of a plurality of the velocity regions.

Alternatively, the control portion 11 in the PND 1 may be configured in such a manner that it calculates a correction coefficient only for a predetermined velocity, for example, a high velocity at 60 [km] per hour or higher when calculating a correction coefficient of the velocity V and the GPS velocity $V_g$.

Further, the embodiment of the present invention above has described a case where navigation is performed according to the current position calculation processing procedure while the PND 1 receives a supply of source power.

It should be appreciated, however, that the present invention is not limited to the embodiment described above. The PND 1 may be configured in such a manner that in a case where the PND 1 is turned OFF when the power supply button (not shown) is depressed by the user, it stores the current position, the altitude, and the like at a point in time when the power supply button is depressed into the memory portion 12. Accordingly, when the user depresses the power supply button again to turn ON the PND 1, it reads out the current position, the altitude, and the like from the memory portion 12 to resume navigation according to the current position calculation processing procedure from the current position, the altitude, and the like that have been read out.

Further, the embodiment of the present invention above has described a case where the PND 1 calculates the velocity V while it is held by the cradle 3 mounted on the dashboard of the vehicle. It should be appreciated, however, that the present invention is not limited to the embodiment described above. The PND 1 may be configured in such a manner that it sets the velocity V to 0 or maintains the previous value velocity $V_{n-1}$ when it acknowledges that it is removed mechanically or electrically from the cradle 3.

Further, the embodiment of the present invention above has described a case where the PND 1 is used while it is in a transversely mounted state to be long in the right-left direction. It should be appreciated, however, that the present invention is not limited to the embodiment described above.

Figure 38:
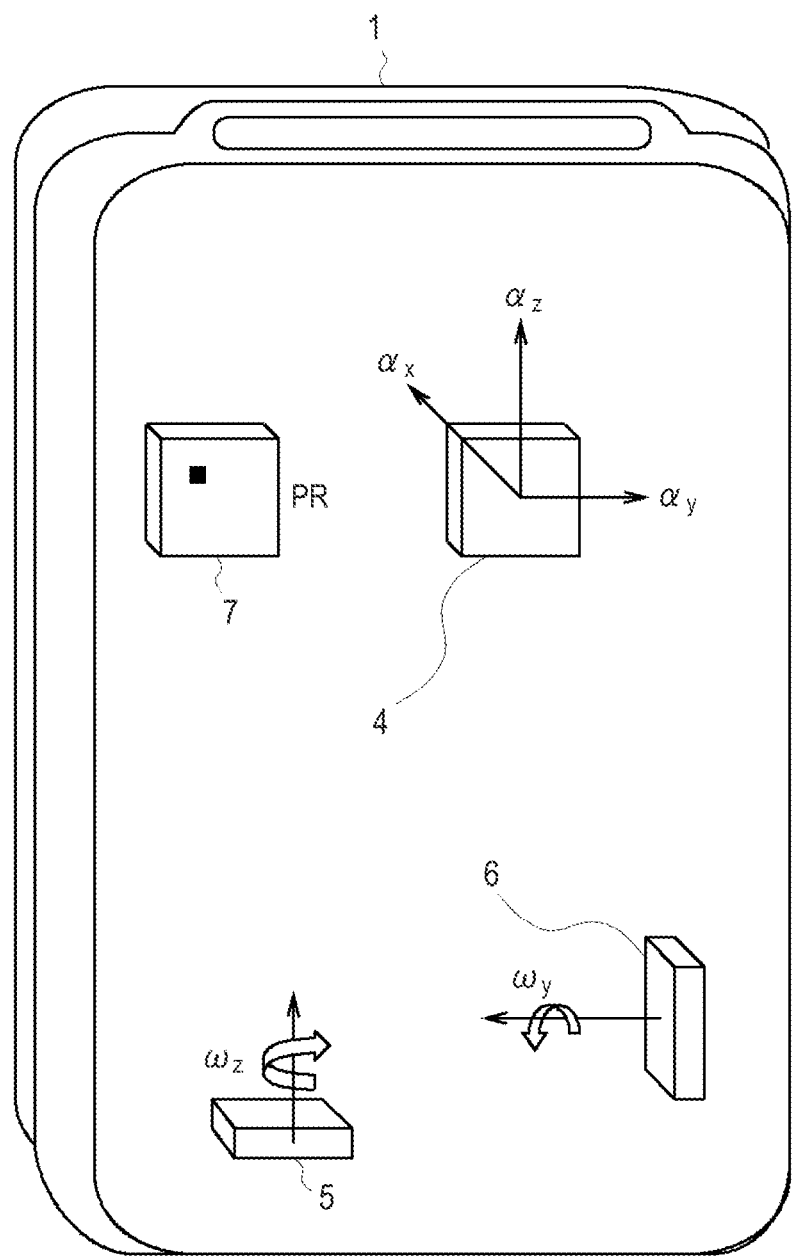
FIG. 38 is a diagram schematically showing an example of use in another embodiment of the present invention.

As is shown in FIG. 38, the PND 1 may be used in a longitudinally mounted state to be long in the length direction. In this case, the PND 1 is configured to detect the yaw rate $\omega_z$ about the Z axis by the Y axis gyro sensor 5 and to detect the pitch rate $\omega_y$ about the Y axis by the Z axis gyro sensor 6.

Further, the embodiment of the present invention descried above has described a case where the triaxial acceleration sensor 4, the Y axis gyro sensor 5, the Z axis gyro sensor 6, and the pressure sensor 7 are provided inside the PND 1. It should be appreciated, however, that the present invention is not limited to the embodiment described above. It may be configured in such a manner that the triaxial acceleration sensor 4, the Y axis gyro sensor 5, the Z axis gyro sensor 6, and the pressure sensor 7 are provided to the outside of the PND 1.

In addition, the PND 1 may be provided with an adjustment mechanism capable of adjusting attachment angles of the triaxial acceleration sensor 4, the Y axis gyro sensor 5, the Z axis gyro sensor 6, and the pressure sensor 7, for example, on the side face of the PND 1.

Accordingly, even in a case where the display portion 2 is not provided to be substantially perpendicular to the travel direction of the vehicle, it is possible for the PND 1 to align, for example, the rotation axis of the Y axis gyro sensor 5 with the vertical direction of the vehicle by allowing the user to make an adjustment via the adjusting mechanism.

Further, in the embodiment of the present invention described above, the velocity V is determined as being excessively high in a case where the pitch rate $\omega_y$ corresponding to the pitch rate data PD2 is smaller than a predetermined threshold value and the acceleration $\alpha_z$ corresponding to the acceleration data AD2 and the pitch rate $\omega_y$ corresponding to the pitch rate PD2 are larger than corresponding predetermined threshold values. It should be appreciated, however, that the present invention is not limited to the embodiment described above. The control portion 11 may be configured in such a manner that it determines that the velocity V is excessively high when the velocity V calculated by the velocity computation portion 34 takes a value larger than the previous value velocity $V_{n-1}$ by a predetermined velocity or more.

In this case, the smoothing and noise removal portion 35 sets the velocity V to 0 when the velocity V calculated by the velocity computation portion 34 takes a value larger than the previous value velocity $V_{n-1}$ by a predetermined velocity or more and when the previous value velocity $V_{n-1}$ is an extremely low velocity, for example, lower than 10 [km] per hour. Meanwhile, the smoothing and noise removal portion 35 uses the previous value velocity $V_{n-1}$ as the velocity V when the velocity V calculated by the velocity computation portion 34 takes a value larger than the previous value velocity $V_{n-1}$ by a predetermined velocity or more and when the previous value velocity $V_{n-1}$ is, for example, 10 [km] per hour or higher.

Further, the embodiment of the present invention above has described a case where the control portion 11 in the PND 1 performs the current position calculation processing procedure in Routine RT1 described above according to the application program pre-stored in the memory portion 12. It should be appreciated, however, that the present invention is not limited to the embodiment described above. The control portion 11 in the PND 1 may be configured in such a manner that it performs the current position calculation processing procedure according to an application program installed from a storage medium, an application program downloaded from the Internet, and application programs installed in various other routes.

Further, the embodiment of the present invention above has described a case where the PND 1 as the velocity calculation device of the embodiment of the present invention is formed of the triaxial acceleration sensor 4 as a vertical direction acceleration detection portion, the Y axis gyro sensor 5 as a horizontal direction angular velocity detection portion, and the velocity calculation portion 22 as a velocity calculation portion. It should be appreciated, however, that the present invention is not limited to the embodiment described above. The velocity calculation device may be formed of a vertical direction acceleration detection portion, a horizontal direction angular velocity detection portion, and a velocity calculation portion of other various configurations.

The velocity calculation device, the velocity calculation method, and the navigation device according to the embodiment of the present invention are suitably used as a PND and a stationary navigation device mounted on a vehicle as well as other various mobile bodies, such as a motor cycle and an electrical train.

The present application contains subject matter related to that disclosed in Japanese Priority Patent Application JP 2008-221713 filed in the Japan Patent Office on Aug. 29, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A velocity calculation device comprising:
   a vertical direction acceleration detection portion that is mounted on a vehicle and detects accelerations in a vertical direction generated correspondingly to undulation of a road surface continuously in succession at a predetermined sampling frequency;
   a horizontal direction angular velocity detection portion that is mounted on the vehicle and detects angular velocities about a horizontal axis orthogonal to a travel direction of the vehicle generated correspondingly to the undulation of the road surface continuously in succession at the predetermined sampling frequency; and
   circuitry configured to calculate a succession of velocities in the travel direction of the vehicle on the basis of the accelerations in the vertical direction and the angular velocities about the horizontal axis,
   wherein the circuitry is configured to calculate a first velocity of the succession of calculated velocities, in which the first velocity is after a second velocity in the succession of calculated velocities, using a predetermined sampling number of data points, from among data points according to the predetermined sampling frequency, about a data point corresponding a position of the vehicle at which the second velocity is calculated,
   in which the predetermined sampling number of data points is determined according to whether the second velocity is lower than a predetermined velocity.

2. The velocity calculation device according to claim 1, wherein the circuitry is configured to change the predetermined sampling number of data points by increasing the predetermined sampling number of data points when the second velocity is at the predetermined velocity or higher and decreasing the predetermined sampling number of data points when the second velocity is lower than the predetermined velocity.

3. The velocity calculation device according to claim 2, wherein the circuitry is configured to provide a hysteresis characteristic when changing the predetermined sampling number of data points.

4. The velocity calculation device according to claim 3, wherein the circuitry is configured to extract a maximum value and a minimum value from the accelerations in the vertical direction in the predetermined sampling number of data points as a maximum acceleration and a minimum acceleration, respectively, to extract a maximum value and a minimum value from the angular velocities about the horizontal axis in the predetermined sampling number of data points as a maximum angular velocity and a minimum angular velocity, respectively, and to calculate the first velocity by dividing a difference between the maximum acceleration and the minimum acceleration by a difference between the maximum angular velocity and the minimum angular velocity.

5. The velocity calculation device according to claim 1, wherein the circuitry is configured to set a given velocity to 0 in a case where the given velocity takes a value larger than a last velocity by a predetermined threshold value or more and the last velocity is lower than a predetermined second velocity, and use the last velocity as the given velocity in a case where the given velocity takes a value larger than the last velocity by the predetermined threshold value or more and the last velocity is as high as or higher than the predetermined second velocity.

6. The velocity calculation device according to claim 1, wherein in a case where the velocity calculation device is held by a cradle, a low-pass filter is applied to the accelerations in the vertical direction and the angular velocities about the horizontal axis in order to remove a predetermined frequency component generated by the cradle.

7. A velocity calculation method comprising the steps of:
detecting accelerations in a vertical direction generated in a vehicle correspondingly to undulation of a road surface continuously in succession at a predetermined sampling frequency;
detecting angular velocities about a horizontal axis orthogonal to a travel direction of the vehicle generated correspondingly to the undulation of the road surface continuously in succession at the predetermined sampling frequency; and
calculating a succession of velocities in the travel direction of the vehicle on the basis of the accelerations in the vertical direction and the angular velocities about the horizontal axis,
wherein a first velocity of the succession of calculated velocities, in which the first velocity is after a second velocity in the succession of calculated velocities, is calculated using a predetermined sampling number of data points, from among data points according to the predetermined sampling frequency, about a data point corresponding to a position of the vehicle at which the second velocity is calculated,
in which the predetermined sampling number of data points is determined according to whether the second velocity is lower than a predetermined velocity.

8. A navigation device comprising:
a vertical direction acceleration detection portion that detects accelerations in a vertical direction generated in a vehicle correspondingly to undulation of a road surface continuously in succession at a predetermined sampling frequency;
a horizontal direction angular velocity detection portion that detects angular velocities about a horizontal axis orthogonal to a travel direction of the vehicle generated correspondingly to the undulation of the road surface continuously in succession at the predetermined sampling frequency; and
circuitry configured to calculate a succession of velocity velocities in the travel direction of the vehicle on the basis of the accelerations in the vertical direction and the angular velocities about the horizontal axis;
wherein the circuitry is configured to calculate a first velocity of the succession of calculated velocities, in which the first velocity is after a second velocity in the succession of calculated velocities, using a predetermined sampling number of data points, from among data points according to the predetermined sampling frequency, about a data point corresponding to a position of the vehicle at which the second velocity is calculated,
wherein the circuitry is configured to calculate an angular velocity about a vertical axis that is perpendicular to the travel direction, an angle by which the vehicle has turned on the basis of the angular velocity about the vertical axis, and a position of the vehicle on the basis of a given velocity of the succession of velocities and the angle.

* * * * *